US012661823B2

(12) United States Patent
Fischer et al.

(10) Patent No.: US 12,661,823 B2
(45) Date of Patent: Jun. 23, 2026

(54) WOOD-DRILLING DEVICE, WOOD-DRILLING SYSTEM, AND METHOD FOR PRODUCING A WOOD-DRILLING DEVICE

(71) Applicant: Robert Bosch GmbH, Stuttgart (DE)

(72) Inventors: Martin Fischer, Luterbach (CH); Stefan Christen, Langendorf (CH); Lorenz Kaeser, Rüttenen (CH)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 18/572,662

(22) PCT Filed: Jun. 20, 2022

(86) PCT No.: PCT/EP2022/066648
§ 371 (c)(1),
(2) Date: Dec. 20, 2023

(87) PCT Pub. No.: WO2023/274759
PCT Pub. Date: Jan. 5, 2023

(65) Prior Publication Data

US 2024/0286309 A1 Aug. 29, 2024

(30) Foreign Application Priority Data

Jun. 30, 2021 (DE) ..................... 10 2021 206 797.2

(51) Int. Cl.
*B27G 15/00* (2006.01)

(52) U.S. Cl.
CPC .................................... *B27G 15/00* (2013.01)

(58) Field of Classification Search
CPC ..................................................... B27G 15/00
See application file for complete search history.

(56) References Cited

U.S. PATENT DOCUMENTS 1,483,082 A * 2/1924 Dosimont ............. B27G 15/00 408/214
2,332,295 A 10/1943 Bouchal
(Continued)

FOREIGN PATENT DOCUMENTS

CN 101821068 A 9/2010
CN 210025632 U 2/2020
(Continued)

OTHER PUBLICATIONS

International Search Report corresponding to PCT Application No. PCT/EP2022/066648, mailed Sep. 22, 2022 (German and English language document) (5 pages).

*Primary Examiner* — Ryan J. Walters
(74) *Attorney, Agent, or Firm* — Maginot, Moore & Beck LLP

(57) ABSTRACT

A wood-drilling device includes at least one drill shank, at least one drill tip, and at least one cutting body. The cutting body has at least one cutting wing, wherein at least one of the cutting wings has a cutting surface, which is arranged on a base side facing towards the drill tip. The cutting surface is formed by at least two mutually adjoining cutting partial surfaces which are angled away from a drill plane, oriented perpendicular to the rotation axis, in the direction of the drill shank and which are angled to each other at an angle and each have an angle to the rotation axis different from 0°.

13 Claims, 16 Drawing Sheets

(56) References Cited

U.S. PATENT DOCUMENTS

| | | | | |
|---|---|---|---|---|
| 2,618,304 | A * | 11/1952 | Wilson | B27G 15/00 408/195 |
| 3,779,664 | A * | 12/1973 | Caley | B23B 51/02 72/464 |
| 5,697,738 | A | 12/1997 | Stone et al. | |
| 5,700,113 | A * | 12/1997 | Stone | B27G 15/00 408/1 R |
| 5,975,813 | A * | 11/1999 | Schmotzer | B27G 15/00 408/230 |
| 11,638,960 | B2 * | 5/2023 | Ren | B23B 51/0095 408/214 |
| 12,246,468 | B2 * | 3/2025 | Durfee | B27G 15/00 |
| 12,485,494 | B2 | 12/2025 | Pelentir et al. | |
| 2008/0166194 | A1 | 7/2008 | Durfee | |
| 2009/0116919 | A1 * | 5/2009 | Dost | B27G 15/00 408/229 |
| 2010/0202845 | A1 * | 8/2010 | Fang | B23B 51/00035 408/224 |
| 2013/0189044 | A1 * | 7/2013 | Durfee | B23B 51/02 408/214 |

FOREIGN PATENT DOCUMENTS

| | | | |
|---|---|---|---|
| DE | 24 44 899 | A1 | 4/1976 |
| DE | 39 08 674 | A1 | 10/1989 |
| DE | 10 2019 218 421 | A1 | 5/2021 |
| EP | 0 089 123 | A1 | 9/1983 |
| EP | 0 107 651 | B1 | 12/1986 |
| JP | H11-156811 | A | 6/1999 |

* cited by examiner

WOOD-DRILLING DEVICE, WOOD-DRILLING SYSTEM, AND METHOD FOR PRODUCING A WOOD-DRILLING DEVICE

This application is a 35 U.S.C. § 371 National Stage Application of PCT/EP2022/066648, filed on Jun. 20, 2022, which claims the benefit of priority to Serial No. DE 10 2021 206 797.2, filed on Jun. 30, 2021 in Germany, the disclosures of which are incorporated herein by reference in their entirety.

BACKGROUND

Various wood-drilling tools are already known from the prior art.

SUMMARY

The disclosure starts with a wood-drilling device for drilling, in particular impact drilling, of a wood material, in particular containing metal fragments, with at least one drill shank, which is provided for clamping on a machine tool, with at least one drill tip, which preferably has a thread, and with at least one cutting body for cutting the wood material, wherein the cutting body has at least one, preferably at least two, cutting wings, that are in particular arranged symmetrically in relation to one another in relation to a rotation axis of the cutting body, wherein at least one of the cutting wings has a cutting surface which is arranged on a base side facing the drill tip, which base side is defined in particular in relation to an imaginary cylinder about the rotation axis.

It is proposed that the cutting surface is formed by at least two adjacent cutting partial surfaces which are angled from a drill plane aligned perpendicular to the rotation axis in the direction of the drill shank, which are angled at an angle in relation to one another, and which each have an angle other than 0° in relation to the rotation axis.

Preferably, the wood-drilling device comprises a drill tip, a cutting body and a drill shank, which together form a drilling unit. Preferably, the drilling unit is formed from a single, in particular at least partially metallic, preferably at least for the most part metallic, material composition, in particular from spring steel. Preferably, the drilling unit is formed in one piece. In particular, the drill tip and the cutting body are formed in one piece. In particular, the cutting body and the drill shank are formed in one piece. In particular, "in one piece" is to be understood as at least materially joined, for example by a welding process, an adhesive process, an injection molding process and/or any other process that appears reasonable to the person skilled in the art, and/or advantageously formed in one piece, such as by a production from casting and/or by production in a forging process or single- or multi-component injection molding process, and advantageously from a single blank. Preferably, the drill tip is connected to the cutting body at an end facing away from the drill shank. Preferably, the drill shank is connected to the cutting body at an end facing away from the drill tip. Preferably, the drilling unit is formed materially around the rotation axis. Preferably, the drilling unit is formed so that it is free of cavities inside the drilling unit. Particularly preferably, the drilling unit materially extends along the rotation axis, wherein a portion of the rotation axis extending between an end of the drill tip facing away from the drill shank and an end of the drill shank turned away from the drill tip through a material portion of the drilling unit. The drill shank at least partially has a different hardness from the drill tip, in particular as measured according to Rockwell.

Preferably, the drill tip comprises a thread. Preferably, the drill tip is formed materially symmetrically about the rotation axis apart from deviations of a maximum of 20%, preferably a maximum of 10%, in particular by volume. Preferably, the drill tip forms an end of the drilling unit that faces away from the drill shank.

Preferably, the drill shank has a shank body and a tool connecting body. Preferably, the tool connecting body is provided in portions for clamping on the machine tool. The term "provided" in particular is to be understood as specifically formed, programmed, designed, and/or equipped. The phrase "an object being provided for a specific function" in particular is to be understood is as meaning that the object fulfills and/or performs this specific function in at least one application and/or operating state. An operating state of the wood drilling device preferably is to be understood as a state in which the wood-drilling device is clamped to the machine tool and is preferably driven by the machine tool so that it rotates about the rotation axis.

Preferably, the shank body has a uniform, in particular constant, diameter. Preferably, the shank body has a uniformly sized, in particular constantly sized, cross-section perpendicular to the rotation axis, in particular independently of a measurement point along the rotation axis, in particular as measured on a surface of the cross-section. Preferably, the shank body has a uniformly shaped cross-section perpendicular to the rotation axis, in particular independently of a measurement point along the rotation axis, in particular as viewed on an outer contour of the cross-section. Preferably, the shank body is arranged between the cutting body and the tool connecting body. The shank body preferably has a cross-section that lies perpendicular to the rotation axis, with a circular outer contour.

Preferably, the tool connecting body comprises a transition region and a coupling region. Preferably, only the coupling region of the tool connecting body for clamping on the machine tool is provided. The coupling region is preferably designed as a hex region. Alternatively, the coupling region can be designed as a triplet, quat, hept, sept, oct region or the like, for example, wherein a triplet region describes a region, which is optionally partially formed in a cross-section perpendicular to the rotation axis by at least one rounded outer contour and which is partially formed by three, in particular ground, linear outer contours, and wherein higher numbered regions are defined analogously to the triplet region. Alternatively, the coupling region can have a substantially circular outer contour in a cross-section perpendicular to the rotation axis, which has partially flattened sections. Preferably, the coupling region, in particular the hex region, is designed, in particular formed, to be clamped on the machine tool. Preferably, the tool connecting body in the coupling region has a cross-section that lies perpendicular to the rotation axis with a hexagonal outer contour. Preferably, the transition region is arranged between the coupling region and the shank body. Preferably, the tool connecting body in the transition region as viewed along the rotation axis has various cross-sections perpendicular to the rotation axis, wherein the cross-sections have an outer contour, which forms a continuous transition between a hexagonal outer contour such as the tool connecting body and a circular outer contour such as the shank body. Preferably, the coupling region, in particular the hex region, forms an end of the drilling unit that faces away from the drill tip. The coupling region, in particular the hex region, can have a partial coupling region in which the coupling region, in particular the hex region, is designed to be tapered, preferably for snap-fit clamping on the machine tool. In particular, the coupling region, in particular the hex region, can have a cross-section perpendicular to the rotation axis in the partial coupling region, which has a non-uniformly shaped outer contour. In particular, the coupling region, in particular the hex region, can have a cross-section perpendicular to the rotation axis in the partial coupling region, which has an outer contour of hexagonal difference, in particular a circular outer contour. Preferably, the cutting body has a larger diameter at a boundary to the shank body, in particular a greater maximum extension perpendicular to the rotation axis, than the shank body.

Preferably, the cutting body has at least two cutting wings, preferably precisely two cutting wings, in particular arranged symmetrically in relation to one another in relation to a rotation axis of the cutting body. Preferably, the at least two cutting wings are symmetrically shaped. Preferably, a maximum radius, in particular a diameter, in particular a maximum extension of the cutting body perpendicular to the rotation axis, the drilling unit, in particular the wood-drilling device, is formed in relation to the rotation axis on the cutting wing. Preferably, the at least two cutting wings are arranged opposite each other in relation to the rotation axis. Preferably, a cutting wing is to be interpreted as a part of the cutting body that projects radially from the rotation axis, preferably opposite a central portion of the cutting body, wherein the cutting body is formed completely symmetrically around the rotation axis. The cutting body can have at least three, four, five or the like cutting wings that are symmetrically arranged in relation to one another relative to a rotation axis of the cutting body. Preferably, the cutting body as viewed along the rotation axis has non-uniform maximum transverse extensions, in particular non-uniform maximum diameters, perpendicular to the rotation axis. Preferably, the cutting body has a greater maximum radius, in particular diameter, in particular a greater maximum extension perpendicular to the rotation axis than the drill shank.

The cutting body preferably has a base side, in particular the front side. Preferably, the base side is defined in relation to a smallest imaginary cylinder, which has a cylinder axis, which is identical to the rotation axis, and which only just completely encloses the cutting body. Preferably, the base side consists of one side of the cutting body which faces the drill tip and which, in particular, faces a base side of the smallest imaginary cylinder. Preferably, the base side of the cutting body defines the imaginary drill plane as a plane, which is directly adjacent to the base side of the cutting body, and is aligned perpendicular to the rotation axis. Preferably, the drill plane is an imaginary plane, which is oriented perpendicular to the rotation axis, and which is arranged at the end of the cutting body that faces the drill tip between the drill tip and the cutting body. Preferably, the drill plane is arranged directly adjacently to the cutting body. Preferably, the imaginary drill plane is arranged directly adjacently to the cutting body.

Preferably, the at least one, preferably at least two, cutting wings, preferably in each case, have a cutting surface, which is arranged on the base side of the cutting body that faces the drill tip. Preferably, a smallest distance of the cutting surfaces to the rotation axis is at least a maximum thickness, preferably at least 120% of the maximum thickness, of the drill tip, in particular as measured perpendicular to the rotation axis. Preferably, the cutting surfaces can be directly adjacent to the drill tip, however it would also be conceivable for the cutting surfaces to be at least partially spaced from the drill tip, for example for production reasons. Preferably, the at least two cutting surfaces are arranged symmetrically in relation to each other about the rotation axis. Preferably, the cutting surface, in particular an edge of the cutting surface, is at least partially designed to remove, cut, and/or wear away the wood material and/or metal fragments in the wood material, in particular in the operating state of the wood-drilling device. Preferably, the at least one, preferably each, cutting surface is formed by at least two, in particular precisely two, directly adjacent cutting surfaces, in particular forming a common boundary edge towards each other. Preferably, the at least one, preferably each, cutting surface is formed by at least two, in particular precisely two, in particular along an increasing diameter, cutting partial surfaces that are angled from the drill plane towards the drill shank and are adjacent to one another. Preferably, the at least two cutting partial surfaces of each cutting surface are angled towards each other at an angle of at least 10°, preferably at least 20°, more preferably at least 30°, and more preferably at least 40°. Preferably, the at least two cutting partial surfaces of each cutting surface are angled towards each other at an angle of no more than 80°, preferably no more than 70°, more preferably no more than 60°, and most preferably no more than 50°. Preferably, the at least two cutting partial surfaces of each cutting surface are arranged adjacently one another without an offset, in particular along the rotation axis. Preferably, the at least two cutting partial surfaces of each cutting surface in each case have an angle of 0°, 90°, or 180° in relation to the rotation axis. Preferably, the cutting partial surfaces in each case form obtuse angles in relation to the rotation axis. Preferably, the cutting partial surfaces of a cutting surface in each case form blunt inner angles and/or outer angles towards each other. Preferably, a cutting partial surface of the at least two cutting partial surfaces of each cutting surface that faces the drill tip is less angled from the drill shank towards the drill tip towards a radial direction than a cutting partial surface of the at least two cutting partial surfaces of each cutting surface that faces away from the drill tip. Preferably, the cutting partial surface of the at least two cutting partial surfaces of each cutting surface that faces away from the drill tip is angled more closely from the drill shank along a radial direction than the cutting partial surface of the at least two cutting partial surfaces of each cutting surface facing the drill tip. Preferably, the cutting partial surface of the at least two cutting partial surfaces of each cutting surface that faces away from the drill tip is adjacent to a terminal point of a maximum extension of the cutting body perpendicular to the rotation axis. Preferably, the cutting partial surface of the at least two cutting partial surfaces of each cutting surface that faces away from the drill tip is angled circumferentially opposite the cutting partial surface of the at least two cutting partial surfaces of each cutting surface, in particular opposite a direction of rotation.

Due to the design of the wood-drilling device according to the disclosure, an advantageously robust wood-drilling device can be achieved, which is, in particular, suitable for cutting a plurality of metal fragments when drilling the wood material. In particular, an advantageous gradual chipping of the wood material and/or metal fragments can be achieved. An advantageously durable wood-drilling device can thereby be achieved. Advantageous drilling of wood materials can in particular be achieved, in particular without regard to nail residues or other metal fragments that could be contained in the wood material. Advantageously fast drilling operations can be achieved. In particular, risks to stress singularities at a radial outer edge of the cutting surfaces can be advantageously reduced, thereby reducing wear in particular. An advantageously low drilling resistance can thereby be achieved.

Furthermore, it is proposed that the at least two cutting partial surfaces are formed as flat surfaces. Preferably, the at least two cutting partial surfaces of each cutting surface in each case are designed as flat surfaces, wherein in particular, each point of the surface of one of the at least two cutting partial surfaces is arranged in a two-dimensional plane within production tolerances. Preferably, the at least two cutting partial surfaces are angled along a direction perpendicular to a greatest extension of the cutting body, perpendicular to the rotation axis from the drill plane towards the drill shank. Preferably, the at least two cutting partial surfaces are angled along a direction perpendicular to a greatest extension of the cutting body, perpendicular to the rotation axis from the drill plane towards the drill shank at an angle of at least 2°, preferably at least 5°, in particular within tolerances of a maximum of 1°. Preferably, the at least two cutting partial surfaces are angled along a direction perpendicular to a greatest extension of the cutting body, perpendicular to the rotation axis from the drill plane towards the drill shank at a same angle, in particular up to tolerances of a maximum of 1°. An advantageously robust contact surface of the cutting body with the wood material and/or the metal fragments can be achieved.

It is further proposed that a cutting partial surface of the at least two cutting partial surfaces that faces the drill tip has a 5° angle to the drill plane, up to deviations of a maximum of 2°. Preferably, the at least two cutting partial surfaces of each cutting surface, in particular along an increasing diameter, preferably along the increasing greatest extent of the cutting body perpendicular to the rotation axis, are angled from the drill plane towards the drill shank at least at an angle of at least 2.5°, preferably at least 5°, in particular with a tolerance of 2°. Preferably, at least one of the at least two cutting partial surfaces, in particular, the cutting partial surface of the at least two cutting partial surfaces of each cutting surface facing the drill tip, in particular along an increasing diameter, preferably along the increasing greatest extent of the cutting body perpendicular to the rotation axis, is angled from the drill plane towards the drill shank at least at an angle of at least 2.5°, preferably at least 5°, angled, in particular with a tolerance of a maximum of 2°. An advantageously sharply defined contact edge, in particular to contact the wood material and/or the metal fragments, of the cutting partial surface of the at least two cutting partial surfaces facing the drill tip can be achieved.

Furthermore, it is proposed that a cutting partial surface of the at least two cutting partial surfaces that faces away from the drill tip has a 45° angle to the drill plane up to deviations of a maximum of 5°. Preferably, at least one of the at least two cutting partial surfaces of each cutting surface along an increasing diameter, preferably along the increasing greatest extent of the cutting body perpendicular to the rotation axis, is angled from the drill plane towards the drill shank at least at an angle of at least 30°, preferably at least 35°, more preferably at least 40°, and more preferably at least 45°, in particular with a tolerance of a maximum of 3°. Preferably, the cutting partial surface of the at least two cutting partial surfaces of each cutting surface, in particular along an increasing diameter, preferably along the increasing greatest extent of the cutting body perpendicular to the rotation axis, is angled from the drill plane towards the drill shank at a 45° angle, in particular with a tolerance of a maximum of 5°, preferably with a tolerance of a maximum of 3°. An advantageously stable edge region of the cutting body that faces the wood material can be achieved.

It is furthermore proposed that a cutting partial surface of the at least two cutting partial surfaces that faces the drill tip has a maximum extension perpendicular to the rotation axis, which extends to a maximum of twice as far as a maximum extension perpendicular to the rotation axis of a cutting partial surface of the at least two cutting partial surfaces that faces away from the drill tip. Preferably, the cutting partial surface of the at least two cutting partial surfaces of one of the cutting surfaces facing the drill tip has a maximum extension perpendicular to the rotation axis, which extends at least a third, preferably at least half, particularly preferably at least two thirds, and more particularly preferably at least precisely, as far as a maximum extent perpendicular to the rotation axis of the cutting partial surface of the at least two cutting partial surfaces of one of the cutting surfaces that faces away from the drill tip. Preferably, the cutting partial surface of the at least two cutting partial surfaces of one of the cutting surfaces facing the drill tip has a maximum extent perpendicular to the rotation axis, which extends exactly twice as far as a maximum extent perpendicular to the rotation axis of the cutting partial surface of the at least two cutting partial surfaces of one of the cutting surfaces that faces away from the drill tip. Advantageously large and advantageously robust cutting surfaces of the cutting body can be achieved.

Furthermore, it is proposed that a cutting partial surface of the at least two cutting partial surfaces facing the drill tip has a maximum extension perpendicular to the rotation axis extending at least equal to a maximum extension perpendicular to the rotation axis of a cutting partial surface of the at least two cutting partial surfaces that faces away from the drill tip. Preferably, each of the cutting surfaces has a cutting partial surface arranged, in particular radially on the inner side, and a cutting partial surface arranged, in particular radially on the outer side, facing away from the drill tip. Preferably, the cutting partial surface of a cutting surface that faces the drill tip has a maximum extension perpendicular to the rotation axis, which extends at least one and a half times, preferably at least 1.75 times, more preferably at least 1.8 times, and more preferably at least 1.9 times, as far as a maximum extension perpendicular to the rotation axis of the cutting partial surface of the cutting surface, in particular the same cutting surface that faces away from the drill tip. Advantageously large and advantageously robust cutting surfaces of the cutting body can be achieved.

It is also proposed that at least one of the cutting wings has at least two radial outer surfaces that are angled towards each other along a radial edge, which extends parallel to the rotation axis up to deviations of no more than 15°, which are arranged at a free end of the respective cutting wing radially facing away from the rotation axis, and at a maximum distance from the rotation axis. Preferably, the radial edge extends to deviations of a maximum of 10°, preferably of a maximum of 5°, parallel to the rotation axis. Preferably, the radial edge is arranged on an outer surface of the cutting body maximally spaced from the rotation axis, in particular perpendicular to the rotation axis. Preferably, the radial outer surfaces are arranged on a sheath side of the cutting body, wherein the sheath side of the cutting body is defined, in particular analogously to a sheath side of the smallest imaginary cylinder, which has a cylinder axis, which is identical to the rotation axis and which only just completely encloses the cutting body. Preferably, the radial edge is arranged on the sheath side of the cutting body. Preferably, the radial edge is an outer edge of the cutting body, which separates from one another the two outer surfaces that are on average farthest away from the rotation axis, in particular from all outer surfaces of the cutting body. Preferably, the radial outer surfaces are the outer surfaces of the cutting body which, on average, are arranged farthest away from the rotation axis, in particular of all outer surfaces of the cutting body. Preferably, the cutting body has at least two, preferably precisely two, radial outer surfaces angled towards one another on each cutting wing, which are in particular separated from one another in each case by a radial edge, which in particular extends to deviations of a maximum of 15° parallel to the rotation axis. Preferably, the in each case at least two radial outer surfaces on each cutting wing in each case are concavely angled towards each other as viewed from the rotation axis. Preferably, the at least two, preferably precisely two, radial outer surfaces are angled towards each other at an angle of at least 5°, preferably at least 10°, more preferably at least 15°, and more preferably at least 19°, in particular with a tolerance of a maximum of 6°. Preferably, an outer edge differing from the radial edge, in particular a radial outer edge, of the at least two, preferably precisely two, radial outer surfaces at least partially defines the greatest extension of the cutting body perpendicular to the rotation axis. Preferably, two outer edges perpendicular to the rotation axis and opposite to each other that differ from radial edges, in particular radial outer edges, of the at least two, preferably exactly two, radial outer surfaces of two cutting wings at least partially define the greatest extension of the cutting body perpendicular to the rotation axis. Preferably, the radial outer surfaces are arranged on a radial outer side of the cutting body. Preferably, a radial outer side has one side of the cutting body, which is arranged farthest in the radial direction, in particular from all sides of the cutting body, away from the rotation axis. Preferably, the cutting body has two radial outer sides, which are, on average, equidistant from the rotation axis. An advantageously robust radial outer side of the cutting body can be achieved, which can be advantageously cost-effectively formed.

Moreover, a wood-drilling system with an electric machine tool and with at least one wood-drilling device according to the present disclosure is proposed. The machine tool is preferably designed for holding a wood-drilling device according to the disclosure. Preferably, the tool machine has a tool receptacle for holding, preferably clamping, a wood-drilling device according to the present disclosure. Preferably, the electric machine tool is designed as an electric drilling machine. Advantageous compatibility of the tool holder of the machine tool with the wood-drilling device, in particular the drill shank of the wood-drilling device, can be achieved.

Furthermore, a method for producing a wood drilling device according to the disclosure is proposed. In particular, the method for producing a wood-drilling device according to the disclosure is at least partially designed as a forging method. An advantageously high-quality wood-drilling device can thereby be achieved..

Furthermore, it is proposed that in at least one method step, the drilling unit is forged from a drill head blank, wherein a maximum diameter of the cutting body, in particular as measured perpendicularly to a longitudinal axis of the drill shank, is at least one and a half times as large as an original diameter of the drill head blank, in particular perpendicular to a longitudinal axis of the drill head blank, in particular prior to the forging process. In particular, an original diameter denotes a uniform diameter of a drill head blank prior to a forging process. Preferably, in at least one method step, the drilling unit is forged with a maximum extension perpendicular to the rotation axis from the drill head blank, wherein the original diameter of the drill head blank is measured to be, in particular perpendicular to a longitudinal axis of the drill head blank, in particular prior to the forging process, a maximum of two thirds times as large as the maximum extension of the drilling unit perpendicular to the rotation axis and/or the longitudinal axis of the drilling unit. A "longitudinal axis" of an object is to be understood in particular to signify an axis which runs parallel to a longest edge of a smallest geometric cuboid which only just completely encloses the object, and preferably runs through a geometric center of the object. Alternatively, in at least one method step, the drill shank, the sheath body and the drill tip can be sintered, additively produced, and/or powdered metal injection molded from a drill head blank. Advantageously low-cost production of the wood-drilling device can be achieved.

The wood drilling device according to the disclosure, the wood drilling system according to the disclosure and/or the method according to the disclosure are not to be limited hereby to the application and embodiment described above. In particular, the wood drilling apparatus according to the disclosure, the wood drilling system according to the disclosure, and/or the method according to the disclosure can have a number deviating from a number of individual elements, components, units and process steps described herein in order to fulfill a mode of operation described herein. Moreover, for the ranges of values indicated in this disclosure, values lying within the aforementioned limits are also intended to be considered to be disclosed and usable as desired.

BRIEF DESCRIPTION OF THE DRAWINGS

Further advantages follow from the description of the drawings hereinafter. The drawing shows an embodiment example of the disclosure. The drawing, the description, and the claims contain numerous features in combination. A skilled person will appropriately also consider the features individually and combine them into additional advantageous combinations.

The following are shown.

DETAILED DESCRIPTION

Figure 1:
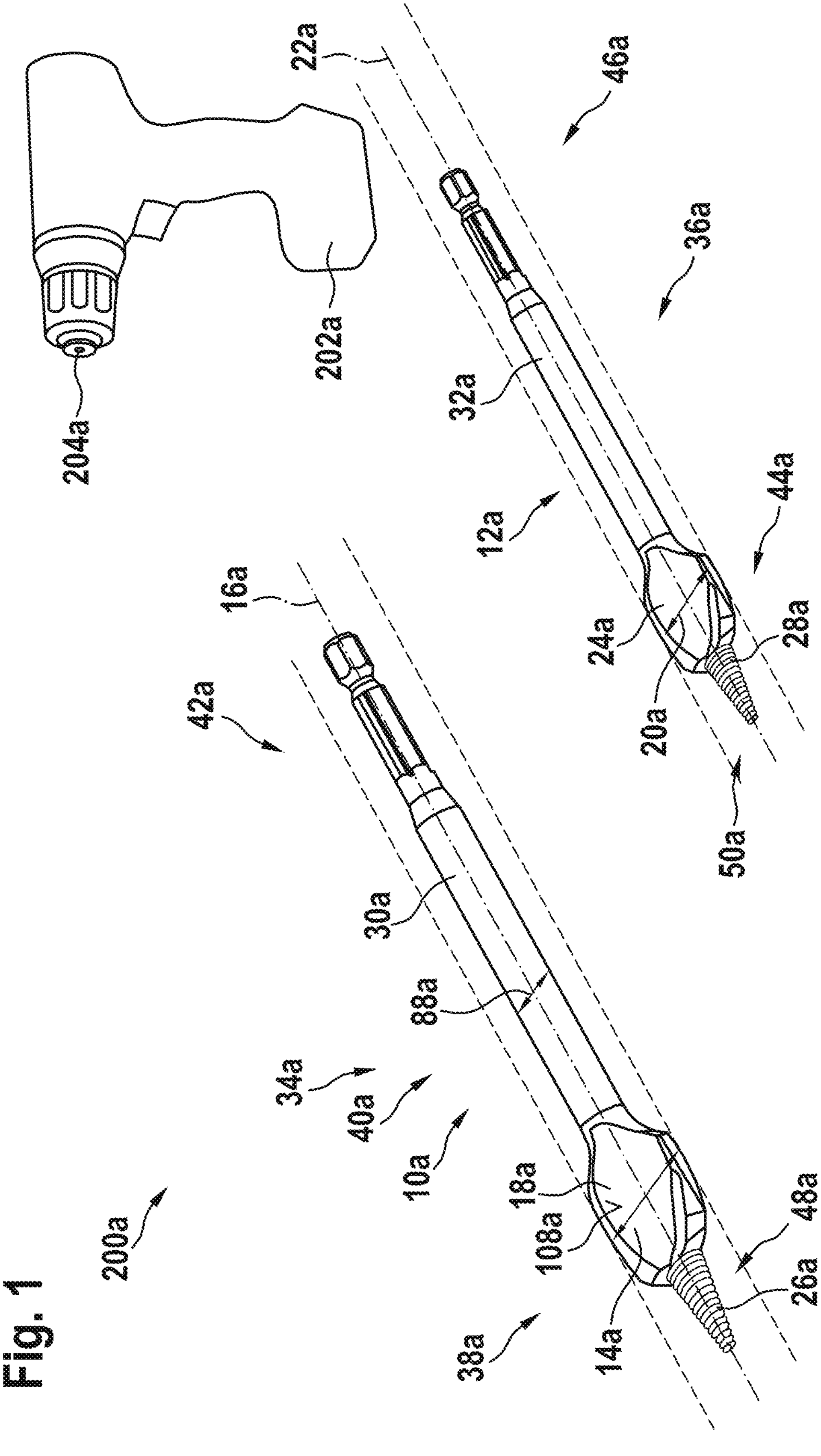
FIG. 1 a wood-drilling system according to the disclosure with two wood-drilling devices according to the disclosure and a machine tool in a schematic representation, FIG. 2 the wood-drilling device according to the disclosure in a schematic diagram, FIG. 3 the wood-drilling device according to the disclosure in a schematic diagram, FIG. 4 the wood-drilling device according to the disclosure in a schematic diagram, FIG. 5 the wood-drilling device according to the disclosure in a schematic diagram, FIG. 6 the wood-drilling device according to the disclosure in a schematic diagram, FIG. 7 the wood-drilling device according to the disclosure in a schematic diagram, FIG. 8 the wood-drilling device according to the disclosure in a schematic diagram FIG. 9 the wood-drilling device according to the disclosure in a schematic diagram, FIG. 10 the wood-drilling device according to the disclosure in a schematic cross-section, FIG. 11 the wood-drilling device according to the disclosure in a schematic cross-section, FIG. 12 the wood-drilling device according to the disclosure in a schematic cross-section, FIG. 13 the wood-drilling device according to the disclosure in a schematic cross-section, FIG. 14 the wood-drilling device according to the disclosure in a schematic cross-section, FIG. 15 the wood-drilling device according to the disclosure in a schematic cross-section, FIG. 16 the wood-drilling device according to the disclosure in a schematic cross-section, FIG. 17 the wood-drilling device according to the disclosure in a schematic cross-section, FIG. 18 a method according to the disclosure in a schematic diagram, FIG. 19 an alternative wood-drilling device according to the disclosure in a schematic diagram, and FIG. 20 the alternative wood-drilling device according to the disclosure in a schematic diagram.

FIG. 1 shows a wood-drilling system 200*a*. The wood-drilling system 200*a* comprises two different wood-drilling devices 10*a*, 12*a*. The wood-drilling system 200*a* comprises an electric machine tool 202*a* for holding in each case one, for example, of the two wood-drilling devices 10*a*, 12*a*. The machine tool 202*a* has a tool receptacle 204*a* for a receptacle, for example a clamping device, of a wood-drilling device 10*a*, 12*a*. The electric machine tool 202*a* is designed as an electric drilling machine and/or as a cordless screwdriver or the like.

A first wood-drilling device 10*a* of the two wood-drilling devices 10*a*, 12*a* has a maximum diameter 14*a* perpendicular to a rotation axis 16*a* of more than 22.5 mm. In particular, the first wood-drilling device 10*a* has a discrete maximum diameter 14*a* of 25.8 mm, 28.6 mm or 32.1 mm, in particular with a tolerance of a maximum of 0.3 mm. The first wood-drilling device 10*a* of the two wood-drilling devices 10*a*, 12*a* has a cutting body 18*a* with a maximum diameter 14*a* perpendicular to the rotation axis 16*a* of more than 22.5 mm. In particular, the cutting body 18*a* of the first wood-drilling device 10*a* has the discrete maximum diameter 14*a* of 25.8 mm, 28.6 mm, or 32.1 mm, in particular with a tolerance of a maximum of 0.3 mm.

A second wood-drilling device 12*a* of the at least two wood-drilling devices 10*a*, 12*a* has a maximum diameter 20*a* perpendicular to a rotation axis 22*a* of a maximum of 22.5 mm. In particular, the second wood-drilling device 12*a* has a discrete maximum diameter 20*a* of 13.0 mm, 16.2 mm, 19, 4 or 22.5 mm, in particular with a tolerance of a maximum of 0.3 mm. The second wood-drilling device 12*a* of the two wood-drilling devices 10*a*, 12*a* has a cutting body 24*a* with a maximum diameter 20*a* perpendicular to the rotation axis 22*a* of a maximum of 22.5 mm. In particular, the cutting body 24*a* of the second wood-drilling device 12*a* has the discrete maximum diameter 20*a* of 13.0 mm, 16.2 mm, 19.4 mm or 22.5 mm, in particular with a tolerance of a maximum of 0.3 mm.

The wood-drilling devices 10*a*, 12*a* in each case comprise a drill tip 26*a*, 28*a*, a cutting body 18*a*, 24*a*, and a drill shank 30*a*, 32*a*, which together in each case form a drilling unit 34*a*, 36*a*. The drilling units 34*a*, 36*a* are, in particular, in each case formed from a material composition. The drilling units 34*a*, 36*a* are, in particular, in each case made of spring steel. The drilling units 34*a*, 36*a* are formed from the same spring steel.

The drilling units 34*a*, 36*a* have a number of distinguishable hardness regions 38*a*, 40*a*, 42*a*, 44*a*, 46*a*, in particular as measured according to Rockwell, which is dependent on a maximum extension 192*a* of the cutting body 18*a*, 24*a* perpendicular to the rotation axis 16*a*, 22*a*, in particular the maximum diameter 14*a*, 20*a* of wood-drilling device 10*a*, 12*a*. The first wood-drilling device 10*a*, in particular a drilling unit 34*a* of the first wood-drilling device 10*a*, has three distinguishable first hardness regions 38*a*, 40*a*, 42*a*, in particular as measured according to Rockwell. The second wood-drilling device 12*a*, in particular a drilling unit 36*a* of the wood-drilling device 12*a*, has two distinguishable second hardness regions 44*a*, 46*a*, in particular as measured according to Rockwell. However, a different number of hardness regions 38*a*, 40*a*, 42*a*, 44*a*, 46*a* that appear to be useful to a person skilled in the art would also be conceivable.

The first wood-drilling device 10*a* differs from the second wood-drilling device 12*a* by a different maximum diameter 14*a*, 20*a* perpendicular to the rotation axis 16*a*, 22*a*. Different sets of multiple wood-drilling devices 10*a*, 12*a* are provided for different machine tools 202*a*. For each set of wood-drilling devices 10*a*, 12*a*, there is a limit value for the maximum diameter 14*a*, 20*a* perpendicular to the rotation axis 16*a*, 22*a* of wood-drilling devices 10*a*, 12*a*, which determines how many distinguishable hardness regions 38*a*, 40*a*, 42*a*, 44*a*, 46*a* the respective wood-drilling devices 10*a*, 12*a* comprise. In this example, the maximum diameter limit 14*a*, 20*a* perpendicular to the rotation axis 16*a*, 22*a* of the wood-drilling devices 10*a*, 12*a* is approximately 22.5 mm. It is conceivable that the limit value for the maximum diameter 14*a*, 20*a* perpendicular to the rotation axis 16*a*, 22*a* of the wood drilling devices 10*a*, 12*a*, which determines how many distinguishable hardness regions 38*a*, 40*a*, 42*a*, 44*a*, 46*a* the respective wood drilling devices 10*a*, 12*a* have, here exemplarily consisting of two distinguishable hardness regions 38*a*, 40*a* or three distinguishable hardness regions 42*a*, 44*a*, 46*a*, varies for different machine tools 202*a*. It is conceivable that the limit value, in particular for the maximum diameter 14*a*, 20*a* perpendicular to the rotation axis 16*a*, 22*a* of the wood drilling devices 10*a*, 12*a*, which in particular determines how many distinguishable hardness areas 38*a*, 40*a*, 42*a*, 44*a*, 46*a* the respective wood drilling devices 10*a*, 12*a* have, can assume values between 5 mm and 50 mm, for example 20 mm, 17.5 mm or 15 mm or also 25 mm, 27.5 mm or 30 mm. For example, the limit value can increase as the power of the machine tools 202*a* increases due to an increased load on the drill shank 30*a*, 32*a*, and decrease as the power of the machine tools 202*a* decreases due to a decreased load on the drill shank 30*a*, 32*a*.

The wood-drilling devices 10*a*, 12*a* are provided, in particular designed, for drilling, in particular impact drilling, a wood material containing metal fragments in particular.

The wood-drilling devices 10*a*, 12*a* in each case comprise a drill shank 30*a*, 32*a*. The drill shanks 30*a*, 32*a*, in particular in each case, are provided in sections for clamping on a machine tool 202*a*. The wood-drilling devices 10*a*, 12*a* in each case comprise a drill tip 26*a*, 28*a*. The drill tips 26*a*, 28*a* in each case have a thread 48*a*, 50*a*, in particular. The wood-drilling devices 10*a*, 12*a* in each case comprise a cutting body 18*a*, 24*a*. The cutting bodies 18*a*, 24*a*, in particular in each case, are intended for cutting wood material. The wood-drilling devices 10*a*, 12*a* in each case define the rotation axes 16*a*, 22*a*.

The drilling units 34*a*, 36*a* are, in particular, in case each formed in one piece. More particularly, the drill tip 26*a*, 28*a* and cutting body 18*a*, 24*a* of each wood-drilling device 10*a*, 12*a* are formed in one piece. In particular, the cutting body 18*a*, 24*a* and the drill shank 30*a*, 32*a* are formed in one piece. In particular, one-piece objects are produced by production in a forging process from a single blank.

Subsequently, the first wood-drilling device 10*a* is described representatively of both wood-drilling devices 10*a*, 12*a*.

The drill tip 26*a* is connected to the cutting body 18*a* at an end of the cutting body 18*a* facing away from the drill shank 30*a*. The drill shank 30*a* is connected to the cutting body 18*a* at an end of the cutting body 18*a* facing away from the drill tip 26*a*. The drilling unit 34*a* is formed materially symmetrically around the rotation axis 16*a*. In this example, the drilling unit 34*a* is formed free of cavities inside the drilling unit 34*a*. In a case of a sintered drilling unit 34*a*, it is conceivable that the drilling unit 34*a* can have cavities, in particular due to production. The drilling unit 34*a* materially extends along the rotation axis 16*a*, wherein a portion of the rotation axis 16*a* extending between an end of the drill tip 26*a* facing away from the drill shank 30*a* to an end of the drill shank 30*a* facing away from the drill tip 26*a* exclusively through a material portion of the drilling unit 34*a*. The cutting body 18*a* has a greater maximum radius, in particular the diameter 14*a*; in particular, a greater maximum extension 192*a* perpendicular to the rotation axis 16*a* than the drill shank 30*a*.

Figure 2:
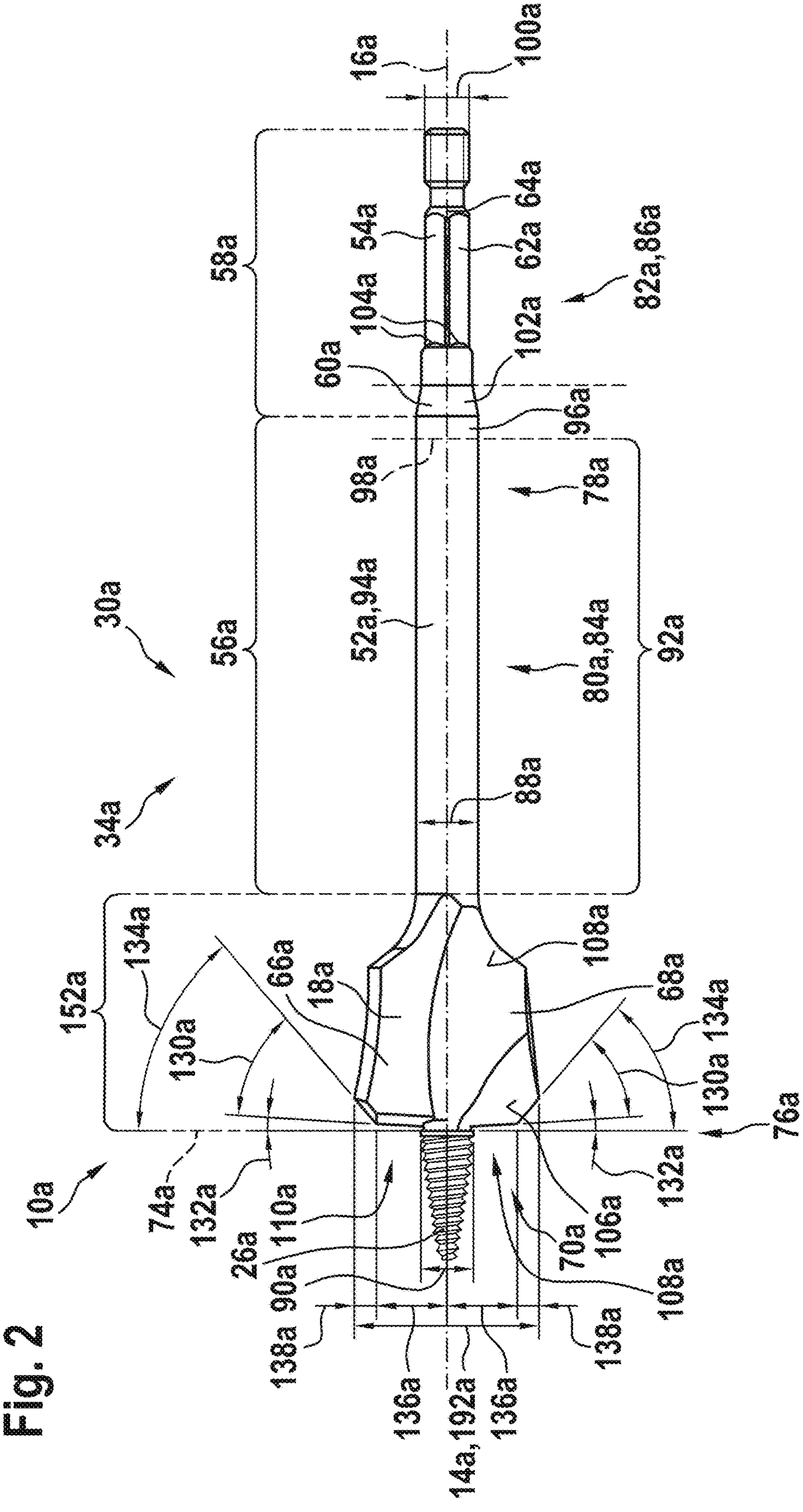

FIG. 2 shows that the drill shank 30*a* has a shank body 52*a* and a tool connecting body 54*a*. The drill shank 32*a* has a shank body 52*a*. The drill shank 32*a* has a tool connecting body 54*a*. The shank body 52*a* and tool connecting body 54*a* are directly connected to each other. The shank body 52*a* and the tool connecting body 54*a* are formed in one piece. A maximum extension 56*a* of the shank body 52*a* is shown in FIG. 2. A maximum extension 58*a* of the tool connecting body 54*a* is shown in FIG. 2. The shank body 52*a* has a uniform diameter 88*a* in this example. The cutting body 18*a* has a larger diameter at a boundary to the shank body 52*a*, in particular a greater maximum extension 192*a* perpendicular to the rotation axis 16*a*, than the shank body 52*a*. The shank body 52*a* has a larger diameter at a boundary to the tool connecting body 54*a*, in particular a greater maximum extension 192*a* perpendicular to the rotation axis 16*a*, than the tool connecting body 54*a*.

The shank body 52*a* is arranged between the tool connecting body 54*a* and the cutting body 18*a*. The shank body 52*a* has two different hardness regions 40*a*, 42*a*, in particular as measured according to Rockwell. The shank body 52*a* has a uniform diameter 88*a*, which is smaller than a maximum diameter 14*a* of the cutting body 18*a*, in particular as a maximum extension 192*a* of the cutting body 18*a* perpendicular to the rotation axis 16*a*. The shank body 52*a* has a uniform diameter 88*a* which is smaller than an average diameter of the cutting body 18*a*, in particular as an average maximum extension 192*a* of the cutting body 18*a* taken along the rotation axis 16*a*, perpendicular to the rotation axis 16*a*. The shank body 52*a* has a uniform diameter 88*a*, which is larger than a maximum diameter 90*a* of the drill tip 26*a*. The shank body 52*a* has a uniform diameter 88*a*, which is larger than an average diameter of the drill tip 26*a*. The shank body 52*a* connects the cutting body 18*a* to the tool connecting body 54*a*. The cutting body 18*a* is spaced apart from the tool connecting body 54*a* about a maximum extension 56*a* of the shank body 52*a* along the rotation axis 16*a*.

The tool connecting body 54*a* is provided in sections for clamping to the machine tool 202*a*. An operating state of the wood-drilling device 10*a* is a state in which the wood-drilling device 10*a* is clamped to the machine tool 202*a* and driven to rotate about the rotation axis 16*a* by the machine tool 202*a*. In this example, the shank body 52*a* has a uniformly sized cross-section perpendicular to the rotation axis 16*a*. In this example, the shank body 52*a* has a uniformly shaped cross-section perpendicular to the rotation axis 16*a*. The shank body 52*a* is arranged between the cutting body 18*a* and the tool connecting body 54*a*. The shank body 52*a* has a circular outer contour in a cross-section perpendicular to the rotation axis 16*a*.

The tool connecting body 54*a* has a transition region 60*a* and a coupling region, in particular a hex region 62*a*. The tool connecting body 54*a* has a transition region 60*a*. The tool connecting body 54*a* has a coupling region, in particular a hex region 62*a*. Only the hex region 62*a* of the tool connecting body 54*a* is provided for clamping on the machine tool 202*a*. The hex region 62*a* is designed, in particular formed, to be clamped to the machine tool 202*a*. The tool connecting body 54*a* has a cross-section in the hex region 62*a* perpendicular to the rotation axis 16*a*, with a hexagonal outer contour. The transition region 60*a* is arranged between the hex region 62*a* and the shank body 52*a*. The tool connecting body 54*a* has various cross-sections perpendicular to the rotation axis 16*a* as viewed in the transition region 60*a* along the rotation axis 16*a*, wherein the cross-sections have an outer contour, forming a continuous transition between a hexagonal outer contour such as the tool connecting body 54*a* and a circular outer contour, such as that of the shank body 52*a*. The hex region 62*a* forms an end of the drilling unit 34*a* that faces away from the drill tip 26*a*. The hex region 62*a* has a partial hex region 64*a*, in which the hex region 62*a* is tapered for a lock-in clamping on the machine tool 202*a*.

In particular, the hex region 62*a* in the partially hex region 64*a* has a cross-section perpendicular to the rotation axis 16*a*, which has a non-uniformly shaped outer contour. In particular, the hex region 62*a* in the partially hex region 64*a* has a cross-section perpendicular to the rotation axis 16*a*, which has an outer contour of hexagonal difference, in particular a circular outer contour.

The cutting body 18*a* has two symmetrically, in particular two-count symmetrically, arranged cutting wings 66*a*, 68*a* relative to the rotation axis 16*a* of the cutting body 18*a*. A maximum radius, in particular a diameter 14*a*, in particular a maximum extension 192*a* of the cutting body 18*a* perpendicular to the rotation axis 16*a*, of the drilling unit 34*a*, in particular the wood-drilling device 10*a*, is formed in relation to the rotation axis 16*a* on the cutting wings 66*a*, 68*a*. The two cutting wings 66*a*, 68*a* are arranged opposite each other in relation to the rotation axis 16*a*. A cutting wing 66*a*, 68*a* is to be interpreted as a part of the cutting body 18*a* that projects radially in a direction from the rotation axis 16*a*, in particular opposite a central portion of the cutting body 18*a* in which the cutting body 18*a* is formed fully symmetrically around the rotation axis 16*a*. The cutting body 18*a* has non-uniform maximum transverse extensions, in particular non-uniform maximum diameters 14*a*, perpendicular to the rotation axis 16*a* as viewed along the rotation axis 16*a*.

Figure 3:
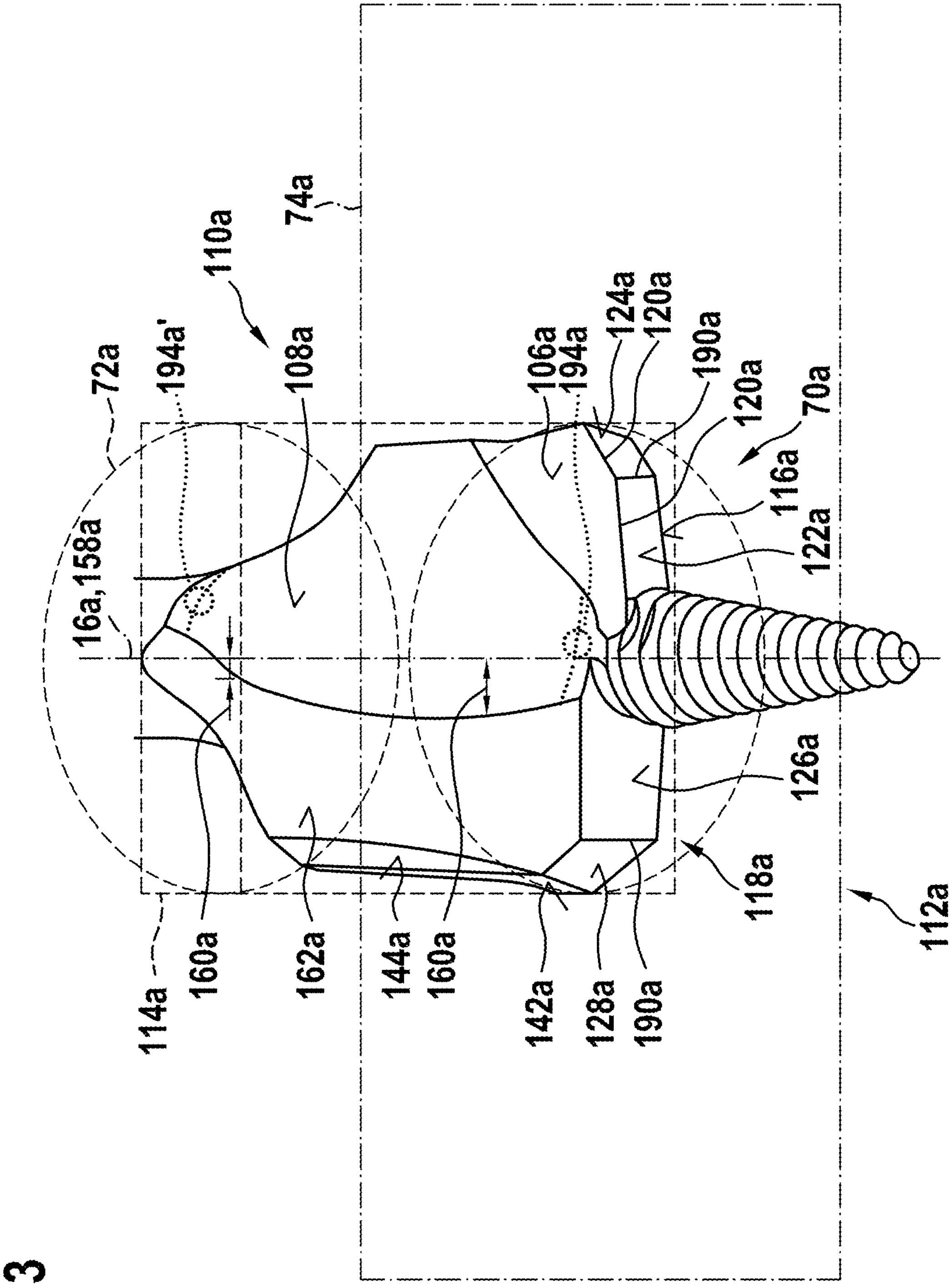

The cutting body 18*a* has a base side 70*a*. The base side 70*a* is defined in relation to an imaginary smallest cylinder 72*a*, which has a cylinder axis, which is identical to the rotation axis 16*a* and only just completely encompasses the cutting body 18*a* (see FIG. 3). The base side 70*a* of the cutting body 18*a* is one side of the cutting body 18*a* which faces the drill tip 26*a* and faces a base side 70*a* of the smallest imaginary cylinder 72*a*. The base side 70*a* of the cutting body 18*a* defines an imaginary drill plane 74*a* (see FIG. 2 and FIG. 3). The drill plane 74*a* is an imaginary plane, which is oriented perpendicular to the rotation axis 16*a* and which is arranged on an end of the cutting body 18*a* facing the drill tip 26*a*, between the drill tip 26*a* and the cutting body 18*a*. The imaginary drill plane 74*a* is arranged directly adjacent to the cutting body 18*a*.

The drilling unit 34*a* comprises at least two distinguishable hardness regions 38*a*, 40*a*, 42*a*, in particular as measured according to Rockwell. The drill shank 30*a* has a hardness that partially differs from the drill tip 26*a*, in particular as measured according to Rockwell. The drilling unit 34*a* comprises at least two distinguishable hardness regions 38*a*, 40*a*, 42*a*, in particular as measured according to Rockwell, which differ by more than 10 HRC. The at least two distinguishable hardness regions 38*a*, 40*a*, 42*a* differ by at least 10 HRC, in particular as measured according to Rockwell. The distinguishable hardness regions 38*a*, 40*a*, 42*a* are separated from each other by at least one hardness limit 98*a*.

A hardness region 38*a* of the at least two hardness regions 38*a*, 40*a*, 42*a* is formed as a peak hardness region 76*a*. The tip hardness region 76*a* is formed by the drill tip 26*a* and the cutting body 18*a*.

The drill tip 26*a* and cutting body 18*a* are of the same hardness in this example, in particular as measured according to Rockwell. The drill tip 26*a* and cutting body 18*a* form the tip hardness region 76*a*, which has a uniform hardness. The hardness of the peak hardness region 76*a* differs from a hardness of the drill shank 30*a*, in particular an average hardness.

A hardness region 38*a* of the at least two hardness regions 38*a*, 40*a*, 42*a*, in particular the peak hardness region 76*a*, has a hardness of at least 53 HRC, in particular as measured according to Rockwell. A hardness region 38*a* of the at least two hardness regions 38*a*, 40*a*, 42*a*, in particular the peak hardness region 76*a*, has a hardness of a maximum of 58 HRC, in particular as measured according to Rockwell. A hardness region 38*a* of the at least two hardness regions 38*a*, 40*a*, 42*a*, in particular the peak hardness region 76*a*, has a hardness of between 53 HRC and 58 HRC, in particular as measured according to Rockwell.

At least one hardness region 40*a*, 42*a* of the at least two hardness regions 38*a*, 40*a*, 42*a* is formed as a shank hardness region 78*a*, which is formed by the shank body 52*a* or the tool connecting body 54*a* for the first wood-drilling device 10*a*, and by the shank body 52*a* and the tool connecting body 54*a* for the second wood-drilling device 12*a*.

At least one hardness region 40*a*, 42*a* of the at least two hardness regions 38*a*, 40*a*, 42*a*, in particular the shank hardness region 78*a*, has a hardness of at least 30 HRC, in particular as measured according to Rockwell. At least one hardness region 40*a*, 42*a* of the at least two hardness regions 38*a*, 40*a*, 42*a*, in particular the shank hardness region 78*a*, has a hardness of a maximum of 58 HRC, in particular as measured according to Rockwell. At least one hardness region 40*a*, 42*a* of the at least two hardness regions 38*a*, 40*a*, 42*a*, in particular the shank hardness region 78*a*, has a hardness of between 30 HRC and 40 HRC for the second wood-drilling rig 12*a*, and a hardness of between 30 HRC and 45 HRC for the first wood-drilling rig 10*a*, or between 53 HRC and 58 HRC, in particular as measured according to Rockwell.

Only for the first wood-drilling device 10*a*, the shank hardness region 78*a* is formed by two partial shank hardness regions 80*a*, 82*a*, in particular a shank body hardness region 84*a*, which is completely formed by the shank body 52*a*, and a tool connecting body hardness region 86*a*, which is for the most part formed by the tool connecting body 54*a* and partially by the shank body 52*a*. For the second wood-drilling device 10*a*, the shank hardness region 78*a* is designed as a region with a uniform, in particular constant, hardness.

A partial shank hardness region 80*a* of the at least two partial shank hardness regions 80*a*, 82*a*, in particular the shank body hardness region 84*a*, has a hardness of at least 30 HRC, in particular as measured according to Rockwell. A partial shank hardness region 80*a* of the at least two shank hardness regions 80*a*, 82*a*, in particular the shank body hardness region 84*a*, has a hardness of a maximum of 45 HRC, in particular as measured according to Rockwell. A partial shank hardness region 80*a* of the at least two partial shank hardness regions 80*a*, 82*a*, in particular the shank body hardness region 84*a*, has a hardness of between 30 HRC and 45 HRC, in particular as measured according to Rockwell.

A partial shank hardness region 82*a* of the at least two partial shank hardness regions 80*a*, 82*a*, in particular the tool connecting hardness region 86*a*, has a hardness of at least 53 HRC, in particular as measured according to Rockwell. A partial hardness region 82*a* of the at least two partial hardness regions 80*a*, 82*a*, in particular the tool connecting body hardness region 86*a*, has a hardness of a maximum of 58 HRC, in particular as measured according to Rockwell. A partial shank hardness region 82*a* of the at least two partial shank hardness regions 80*a*, 82*a*, in particular the tool connecting hardness region 86*a*, has a hardness of between 53 HRC and 58 HRC, in particular as measured according to Rockwell.

The hardness of the tip hardness region 76*a* differs from the hardness of the shank hardness region 78*a*, in particular the shank body hardness region 84*a* and/or the tool connecting hardness region 86*a*, by at least 8 HRC.

The wood-drilling device 10*a* has a coating that partially encases the drilling unit 34*a*. The coating is formed from a material composition that differs from the material composition from which the drilling unit 34*a* is formed. In particular, the cutting body 18*a* and the drill tip 26*a* are coated as part of the drilling unit 34*a*.

The shank body 52*a* and tool connecting body 54*a* have different levels of hardness on average, in particular as measured according to Rockwell. The shank body hardness region 84*a* and the tool connecting hardness region 86*a* have different levels of hardness. The shank body hardness region 84*a* and the tool connecting body hardness region 86*a* have different levels of hardness, which differ by at least 10 HRC.

The shank body 52*a* in each case partially forms the shank body hardness region 84*a* and the tool connecting body hardness region 86*a*. The shank body 52*a* in ease case partially has the shank body hardness region 84*a* and the tool joint body hardness region 86*a*.

A portion of the shank body 52*a* completely forms the shank body hardness region 84*a*, in particular. The portion of the shank body 52*a* forming the shank body hardness region 84*a* extends from the cutting body 18*a* along the rotation axis 16*a* around an extension 92*a* towards the tool connecting body 54*a*, which is shorter than the maximum extension 56*a* of the shank body 52*a*. The shank body hardness region 84*a* is formed solely by the shank body 52*a*. A greater part 94*a* of the shank body 52*a* facing the cutting body 18*a* completely forms the shank body hardness region 84*a*. The greater part 94*a* comprises a maximum of 96% of the shank body 52*a* by volume, in particular from an end of the shank body 52*a* facing the cutting body 18*a*. It is also conceivable that the greater part comprises less than 96%, in particular at most 80%, of the shank body 52*a* by volume, in particular of an end of the shank body 52*a* facing the cutting body 18*a*.

A portion of the shank body 52*a* partially forms the tool connecting body hardness region 86*a*. A minority portion 96*a* of the shank body 52*a* facing the tool connecting body 54*a* forms at least 4% of the tool connecting body hardness region 86*a*, in particular at least 20%, by volume. The minority portion 96*a* is an end of shank body 52*a* that faces the tool connecting body 54*a*.

The shank body 52*a* has a hardness limit 98*a*. The hardness limit 98*a* divides the shank body 52*a* into two hardness regions 40*a*, 42*a* with different levels of hardness. The hardness limit 98*a* is arranged so that it is spaced apart from the tool connecting body 54*a*.

The hardness limit 98*a* delimits the tool connecting body hardness region 86*a* from the shank body hardness region 84*a*. The hardness limit 98*a* is arranged so that it is spaced apart at least 3 mm at one end, in particular an end facing the tool connecting body 54*a*, from the shank body 52*a* on the shank body 52*a*.

The hardness limit 98*a* is perpendicular to the rotation axis 16*a*. The shank body 52*a* is a part of the drill shank 30*a* with a uniform diameter 88*a*, between the insert 18*a* with a larger average diameter, and the tool connecting body 54*a* with a smaller average diameter. The shank body 52*a* terminates along the rotation axis 16*a* exactly where the diameter of the drilling unit 34*a* changes. The hardness limit 98*a* is spaced apart from a geometric boundary between the shank body 52*a* and the tool connecting body 54*a*.

The shank body 52*a* and the tool connecting body 54*a* are of different diameters on average. The shank body 52*a* has a uniform diameter 88*a*, which is larger than an average diameter of the tool connecting body 54*a*. The tool connecting body 54*a* has a smaller diameter 100*a*, in particular a smaller maximum extension perpendicular to the rotation axis 16*a*, at an end facing away from the shank body 52*a*, than the shank body 52*a*.

The transition region 60*a* is arranged between the shank body 52*a* and the hex region 62*a*. The transition region 60*a* has different diameters.

The tool connecting body 54*a* has a hex region 62*a* on a side facing away from the shank body 52*a*, in particular the end. In the hex region 62*a*, the tool connecting body 54*a* has a hexagonal outer contour in a cross-section perpendicular to the rotation axis 16*a*. The tool connecting body 54*a* has the transition region 60*a* on a side that faces the shank body 52*a*, in particular the end. In the transition region 60*a*, the tool connecting body 54*a* has a circular outer contour in a cross-section perpendicular to the rotation axis 16*a*. The tool connecting body 54*a* has a diameter in the transition region 60*a*, in particular the maximum extensions perpendicular to the rotation axis 16*a*, which have a size between a diameter 100*a*, in particular maximum extensions perpendicular to the rotation axis 16*a*, the hex region 62*a* and the diameter 88*a*, in particular maximum extensions perpendicular to the rotation axis 16*a*, of the shank body 52*a*. The transition region 60*a* has a maximum extension parallel to the rotation axis 16*a* of a maximum of 15 mm. The transition region 60*a* has a minimum extension parallel to the rotation axis 16*a* of at least 5 mm.

The tool connecting body 54*a* has a tapered region 102*a*. The transition region 60*a* is partially formed as the tapered region 102*a*. In the tapered region 102*a*, the size of the diameter 100*a* of the tool connecting body 54*a* is linearly aligned from the diameter 100*a*, in particular maximum extensions 192*a* perpendicular to the rotation axis 16*a*, hex range 62*a* to the diameter 88*a*, in particular the maximum extension perpendicular to the rotation axis 16*a*, of the shank body 52*a*. The outer contour of the tapered region 102*a* forms a 10° angle in relation to the rotation axis 16*a*. The outer contour of the tapered region 102*a* can form an angle between 6° and 15° in relation to the rotation axis 16*a*.

The transition region 60*a* has a maximum extension parallel to the rotation axis 16*a* of a maximum of 10 mm. The tapering region 102*a* has a minimum extension parallel to the rotation axis 16*a* of at least 3 mm.

The tapered region 102*a* has a circular cross-section perpendicular to the rotation axis 16*a*. The hex region 62*a* has six toothed elements 104*a* at an end facing the tapering region 102*a*.

The toothed elements 104*a* are arranged at the hex region 62*a* such that the toothed elements 104*a* have a hexagonal cross-section which has the hex region 62*a* at an end facing away from the tapering region 102*a* and is aligned with the circular cross-section of the tapering region 102*a*. The toothed elements 104*a* are formed in one piece with the tool connecting body 54*a*, in particular at the hex region 62*a* and at the transition region 60*a*. In each case, one toothed element 104*a* is arranged externally on each outer surface of the hexagonal outer contour of the hex region 62*a*. The toothed elements 104*a* extend in tooth form from the transition region 60*a* along the rotation axis 16*a* to the hex region 62*a*.

The cutting body 18*a*, on at least one sheath outer side 110*a*, 112*a* which is defined in particular in relation to the imaginary cylinder 72*a* about the rotation axis 16*a*, has a cutting surface 106*a* for cutting the wood material and/or the metal fragments. The cutting body 18*a* has a chip conveying surface 108*a* for cutting the wood material and/or the metal fragments on at least one outer sheath 110*a*, 112*a*, which is defined about the rotation axis 16*a* in particular in relation to the imaginary cylinder 72*a*. The chip conveying surface 108*a* is designed to convey chips along the rotation axis 16*a* as viewed in the direction of the bore shank 30*a* away from the rotation axis 16*a*.

The cutting body 18*a* has two sheath outer sides 110*a*, 112*a*. The sheath outer sides 110*a*, 112*a* of the cutting body 18*a* are located on the sheath side of the cylinder 72*a*, the sides of the cutting body 18*a*, which face the largest outer surfaces of a smallest imaginary cuboid 114*a*. The two outer sheath sides 110*a*, 112*a* are designed analogously to each other, in particular in the same manner, in particular symmetrically to each other.

The two outer sheath faces 110*a*, 112*a* in each case have a chipping surface 106*a* for cutting off the wood material and/or the metal fragments and a chip conveying surface 108*a* which is adjacent to the chipping surface 106*a*, and which is partially concave and partially has a convex curvature.

The cutting wings 66*a*, 68*a*, in particular in each case, have a cutting surface 116*a*, 118*a*. The cutting surfaces 116*a*, 118*a* are arranged spaced apart from the rotation axis 16*a* by a maximum thickness, in particular the diameter 90*a*, of the drill tip 26*a*, in particular perpendicular to the rotation axis 16*a*.

The cutting surfaces 116*a*, 118*a* are arranged on the base side 70*a* facing the drill tip 26*a*, which is defined about the rotation axis 16*a*, in particular in relation to the imaginary cylinder 72*a*. The two cutting surfaces 116*a*, 118*a* on the cutting body 18*a* are arranged symmetrically in relation to each other about the rotation axis 16*a*.

An edge 120*a* of the cutting surface 116*a*, 118*a* is designed to remove, cut, and/or chip the wood material and/or the metal fragments in the wood material, in particular in the operating state of the wood-drilling device 10*a*. The edge 120*a* of the cutting surface 116*a*, 118*a* is formed as the edge 120*a* of the cutting surface 106*a*. The edge 120*a* of the chipping surface 106*a* to the cutting face 116*a*, 118*a* is designed to remove, cut, and/or chip the wood material and/or the metal fragments in the wood material, in particular in the operating state of the wood-drilling device 10*a*.

The, preferably every one of the, cutting surfaces 116*a*, 118*a* are formed by two directly adjacent cutting partial surfaces 122*a*, 124*a*, 126*a*, 128*a*, in particular forming one common boundary cutting edge 190*a* towards each other. The, preferably every one of the, cutting surfaces 116*a*, 118*a* are formed by at least two, in particular exactly two, adjacent cutting part surfaces 122*a*, 124*a*, 126*a*, 128*a*, in particular along an increasing diameter 14*a*, that are angled from the drill plane 74*a* in the direction of the drill shank 30*a*.

The two cutting partial surfaces 122*a*, 124*a*, 126*a*, 128*a* of, in particular, each of the cutting surfaces 116*a*, 118*a* are angled towards each other at an angle 130*a*. The two cutting partial surfaces 122*a*, 124*a*, 126*a*, 128*a* of, in particular, each of the cutting surfaces 116*a*, 118*a* are angled towards each other at an angle 130*a* of 40° (see FIG. 2). The two cutting partial surfaces 122*a*, 124*a*, 126*a*, 128*a* of, in particular, each of the cutting surfaces 116*a*, 118*a* are arranged adjacent to one another without offsets, in particular along the rotation axis 16*a*. The two cutting partial surfaces 122*a*, 124*a*, 126*a*, 128*a* of, in particular, each of the cutting surfaces 116*a*, 118*a* are arranged adjacent to each other. The two cutting partial surfaces 122*a*, 124*a*, 126*a*, 128*a* of, in particular, each of the cutting surfaces 116*a* in each case have a 0° different angle to the rotation axis 16*a*. The two cutting partial surfaces 122*a*, 124*a*, 126*a*, 128*a* of, in particular, each of the cutting surfaces 116*a*, 118*a* in each case have an angle 132*a*, 134*a*, which differs from 0°, 90°, or 180° in relation to the rotation axis 16*a*.

The two cutting part surfaces 122*a*, 124*a*, 126*a*, 128*a* of, in particular, each of the cutting surfaces 116*a*, 118*a* are angled from the drill plane 74*a* oriented perpendicular to the rotation axis 16*a* in the direction of the drill shank 30*a*.

The two cutting partial surfaces 122*a*, 124*a*, 126*a*, 128*a* are formed as flat surfaces. The two cutting partial surfaces 122*a*, 124*a*, 126*a*, 128*a*, in particular each of the cutting surfaces 116*a*, 118*a*, are in each case formed as flat surfaces, wherein, in particular, each point of the surface of the two cutting partial surfaces 122*a*, 124*a*, 126*a*, 128*a*, in particular the, in particular each, of the cutting surfaces 116*a*, 118*a*, is arranged in a two-dimensional plane within production tolerances. The two cutting partial surfaces 122*a*, 124*a*, 126*a*, 128*a*, in particular in each case, are angled along a direction perpendicular to a greatest extension 192*a* of the cutting body 18*a* perpendicular to the rotation axis 16*a* from the drill plane 74*a* towards the drill shank 30*a*.

The two cutting partial surfaces 122*a*, 124*a*, 126*a*, 128*a*, in particular, are in each case angled along a direction perpendicular to a greatest extension 192*a* of the cutting body 18*a* perpendicular to the rotation axis 16*a* from the drill plane 74*a* towards the drill shank 30*a* at an angle 132*a*, 134*a* of at least 5°, in particular within tolerances of a maximum of 1°. The two cutting partial surfaces 122*a*, 124*a*, 126*a*, 128*a* are angled along a direction perpendicular to a greatest extension 192*a* of the cutting body 18*a* perpendicular to the rotation axis 16*a* from the drill plane 74*a* towards the drill shank 30*a* at an equal angle, in particular within tolerances of a maximum of 1°.

The cutting partial surfaces 122*a*, 126*a* of the cutting partial surfaces 122*a*, 124*a*, 126*a*, 128*a* facing the drill tip 26*a* have an angle 132*a* of 5° to the drill plane 74*a* apart from deviations of a maximum of 2°.

The two cutting partial surfaces 122*a*, 124*a*, 126*a*, 128*a* of each cutting surface 116*a*, 118*a*, are, in particular, angled along an increasing diameter 14*a*, preferably along the increasing greatest extent 192*a* of the cutting body 18*a* perpendicular to the rotation axis 16*a*, from the drill plane 74*a* towards the drill shank 30*a* at an angle 132*a*, 134*a* of at least 5°, in particular with a tolerance of 2°.

The cutting partial surfaces 124*a*, 128*a* of the cutting partial surfaces 122*a*, 124*a*, 126*a*, 128*a* facing away from the drill tip 26*a* have an angle 134*a* of 45° to the drill plane 74*a* apart from deviations of a maximum of 5°.

The cutting partial surfaces 124*a*, 128*a* of the cutting partial surfaces 122*a*, 124*a*, 126*a*, 128*a* facing away from the drill tip 26*a* are angled along an increasing diameter 14*a*, preferably along the increasing greatest extension 192*a* of the cutting body 18*a* perpendicular to the rotation axis 16*a*, from the drill plane 74*a* towards the drill shank 30*a* at a maximum angle 134*a* of 45°, in particular with a maximum tolerance of 3°.

The cutting partial surfaces 122*a*, 126*a* of the cutting partial surfaces 122*a*, 124*a*, 126*a*, 128*a* that are arranged facing the drill tip 26*a* have a maximum extension 136*a* perpendicular to the rotation axis 16*a* which extends twice as far as a maximum extension 138*a* perpendicular to the rotation axis 16*a* of a cutting partial surface 124*a*, 128*a* of the two cutting partial surfaces 122*a*, 124*a*, 126*a*, 128*a* of each cutting surface 116*a*, 118*a* arranged facing away from the drill tip 26*a*.

The cutting wings 66*a*, 68*a* have two radial outer surfaces 142*a*, 144*a* that are angled to one another over a radial edge 140*a*. The radial outer surfaces 142*a*, 144*a* are arranged at a free end of the respective cutting wing 66*a*, 68*a* radially facing away from the rotation axis 16*a*, at a maximum distance from the rotation axis 16*a*. The radial edge 140*a* extends parallel to the rotation axis 16*a*, apart from deviations of a maximum of 10°. The radial outer surfaces 142*a*, 144*a* are arranged at a free end of the respective cutting wing 66*a*, 68*a* radially facing away from the rotation axis 16*a*, at a maximum distance from the rotation axis 16*a*. The radial edge 140*a* is arranged at an outer surface 146*a* of the cutting body 18*a*, which is maximally spaced apart from the rotation axis 16*a* perpendicular to the rotation axis 16*a*. The radial outer surfaces 142*a*, 144*a* consist of the outer surfaces of the cutting body 18*a*, which are arranged on average the farthest away, in particular from all outer surfaces of the cutting body 18*a*, from the rotation axis 16*a*. The radial outer surfaces 142*a*, 144*a* are arranged on a radial outer side 148*a* of the cutting body 18*a*. The radial outer side 148*a* consists of one side of the cutting body 18*a*, which is arranged radially farthest away, in particular from all sides of the cutting body 18*a*, from the rotation axis 16*a*.

The cutting body 18*a* has two radial outer sides 148*a*, which are equidistant on average from the rotation axis 16*a*.

The radial outer surfaces 142*a*, 144*a* are arranged on a sheath side of the cutting body 18*a*, wherein the sheath side of the cutting body 18*a* is defined in particular analogously to a sheath side of the smallest imaginary cylinder 72*a*, which has a cylinder axis, which is identical to the rotation axis 16*a* and only just completely encloses the cutting body 18*a*. The radial edge 140*a* is arranged on the sheath side of the cutting body 18*a*. The radial edge 140*a* is an outer edge of the cutting body 18*a*, which separates the two outer surfaces, which are on average the farthest away, in particular from all outer surfaces of the cutting body 18*a*, from the rotation axis 16*a*.

The cutting body 18*a* has two radial outer surfaces 142*a*, 144*a* that are angled to each other on each cutting wing 66*a*, 68*a*, which are in particular separated from each other in each case by a radial edge 140*a*, which in particular extends parallel to the rotation axis 16*a* apart from deviations of a maximum of 10°. Each of the two radial outer surfaces 142*a*, 144*a* is concavely angled to each other on each cutting wing 66*a*, 68*a* in each case as viewed from the rotation axis 16*a*. The two radial outer surfaces 142*a*, 144*a* are angled to one another at an angle of 19°, in particular with a tolerance of a maximum of 6°. An outer edge, which differs from the radial edge 140*a*, in particular a radial outer edge 210*a*, of the two radial outer surfaces 142*a*, 144*a* defines the greatest extension 192*a*, in particular the maximum diameter 14*a*, of the cutting body 18*a* perpendicular to the rotation axis 16*a*. Two outer edges, in particular radial outer edges 210*a*, of the two radial outer surfaces 142*a*, 144*a* of the two cutting wings 66*a*, 68*a*, which are perpendicular to the rotation axis 16*a* and are opposite the radial edges 140*a*, define the greatest extension 192*a*, in particular the maximum diameter 14*a*, of the cutting body 18*a* perpendicular to the rotation axis 16*a*.

The chip conveying surface 108*a* abuts the chipping surface 106*a*. The chipping surface 106*a* is formed completely concavely. The chipping surface 106*a* abuts a cutting surface 116*a*, 118*a*. The chipping surface 106*a* and the chip conveying surface 108*a* separated from one another by a protruding edge, in particular a boundary edge 150*a*. The chipping surfaces 106*a* in each case abut the drill tip 26*a*, one of the cutting surfaces 116*a*, 118*a*, in particular in each case two cutting partial surfaces 122*a*, 124*a*, 126*a*, 128*a*, one radial outer surface 142*a* of the two radial outer surfaces 142*a*, 144*a*, and the chip conveying surface 108*a*.

Each chip conveying surface 108*a* extends from the drill tip 26*a* to less than 10 mm to the drill shank 30*a*, in particular to the shank body 52*a*.

Each chip conveying surface 108*a* extends along the rotation axis 16*a* over at least 95% of a maximum extension 152*a* of the cutting body 18*a* from the drill tip 26*a* towards the drill shank 30*a* via the cutting body 18*a* (see FIG. 2).

The chip conveying surface 108*a* is partially concave and partially has a convex curvature. The chip conveying surface 108*a* is continuously formed so that it is partially concave and partially has a convex curvature along a view on its surface perpendicular to the rotation axis 16*a*. The chip conveying surface 108*a* is formed with a rather convex curvature at an end facing the drill shank 30*a*. The chip conveying surface 108*a* is formed with a rather concave curvature at an end facing the drill shank 30*a*. A center point 194*a*, 194*a*' of an extension of the chip conveying surface 108*a* perpendicular to the rotation axis 16*a* on the chip conveying surface 108*a* is arranged on the drill tip 26*a* closer to the rotation axis 16*a* than on the drill shank 30*a* (see FIG. 3).

The cutting body 18*a*, on the outer lateral sides 110*a*, 112*a*, in particular in each case, has a raised edge 154*a* which extends from an end region of the cutting body 18*a* facing the drill tip 26*a* to an end region of the cutting body 18*a* facing the drill shank 30*a* and which, at the end region of the cutting body 18*a* facing the drill tip 26*a*, has a different average distance 160*a* from a plane 158*a* spanned by the rotation axis 16*a*, which is aligned perpendicular to the rotation axis 16*a* up to a deviation of at most 25° from a maximum extension 192*a*, in particular the maximum diameter 14*a*, of the cutting body 18*a*, than at an end region of the cutting body 18*a* facing the drill shank 30*a* (see FIG. 2).

The two outer sheath sides 110*a*, 112*a* in each case have a raised edge 154*a*. The raised edges 154*a* are outwardly projecting edges of the sheath outer sides 110*a*, 112*a*, in particular of the cutting body 18*a*. The two raised edges 154*a* are formed symmetrically in relation to each other, in particular in relation to the rotation axis 16*a*. In particular, the raised edges 154*a* are edges on the sheath outer sides 110*a*, 112*a* which are formed by material local high points 156*a*, in particular of the cutting body 18*a* away from the rotation axis 16*a*, at a midpoint of a greatest extension of the sheath outer side 110*a*, 112*a* perpendicular to the rotation axis 16*a*. At the end region of the cutting body 18*a* facing the drill tip 26*a*, the two raised edges 154*a* have a greater average distance 160*a* from the plane 158*a* spanned by the rotation axis 16*a*, which is aligned perpendicularly to a maximum deviation of 25 from a maximum extension 192*a* of the cutting body 18*a* perpendicularly to the rotation axis 16*a*, than at an end region of the cutting body 18*a* facing the drill shank 30*a* (see FIG. 2). The elevation edge 154*a*, in particular, limits the length of the elevation edge 154*a*, the at least one chip conveying surface 108*a*, against a further outer surface of the sheath outer side 110*a*, 112*a*, in particular a back surface 162*a*. The raised edges 154*a* follow an arcuate path as viewed along the rotation axis 16*a*. The raised edges 154*a* delineate the chip conveying surface 108*a* from the back surface 162*a* of the sheath outer side 110*a*, 112*a*. A raised edge 154*a* extends across each sheath outer side 110*a*, 112*a* from the end of the cutting body 18*a* facing the drill tip 26*a* to the end of the cutting body 18*a* facing the drill shank 30*a*, limiting the chip conveying surface 108*a* from the back surface 162*a* of the sheath outer side 110*a*, 112*a*, wherein the raised edges 154*a* have an arcuate path as viewed along the rotation axis 16*a*.

The raised edges 154*a* are formed by the high points 156*a* of the sheath outer sides 110*a*, 112*a*, wherein the high points 156*a* are defined relative to a body plane along the rotation axis 16*a* and the greatest extension 192*a* of the cutting body 18*a* perpendicular to the rotation axis 16*a*, in particular the maximum diameter 14*a* of the cutting body 18*a*. The high points 156*a*, in a cross-section perpendicular to the rotation axis 16*a*, represent the points of the sheath outer sides 110*a*, 112*a*, which are at the greatest distance to the body plane in the respective cross-section. The raised edge 154*a* has a greater maximum extension than the maximum extension 152*a* of the cutting body 18*a* parallel to the rotation axis 16*a*, due to the arcuate path.

The chipping surface 106*a* is arranged on the sheath outer side 110*a* of the cutting body 18*a* at one end that faces the drill tip 26*a*, in particular the cutting body 18*a*. The chipping surface 106*a* forms a greater part of a constant chipping angle 168*a* of 18° relative to the rotation axis 16*a*.

Figure 4:
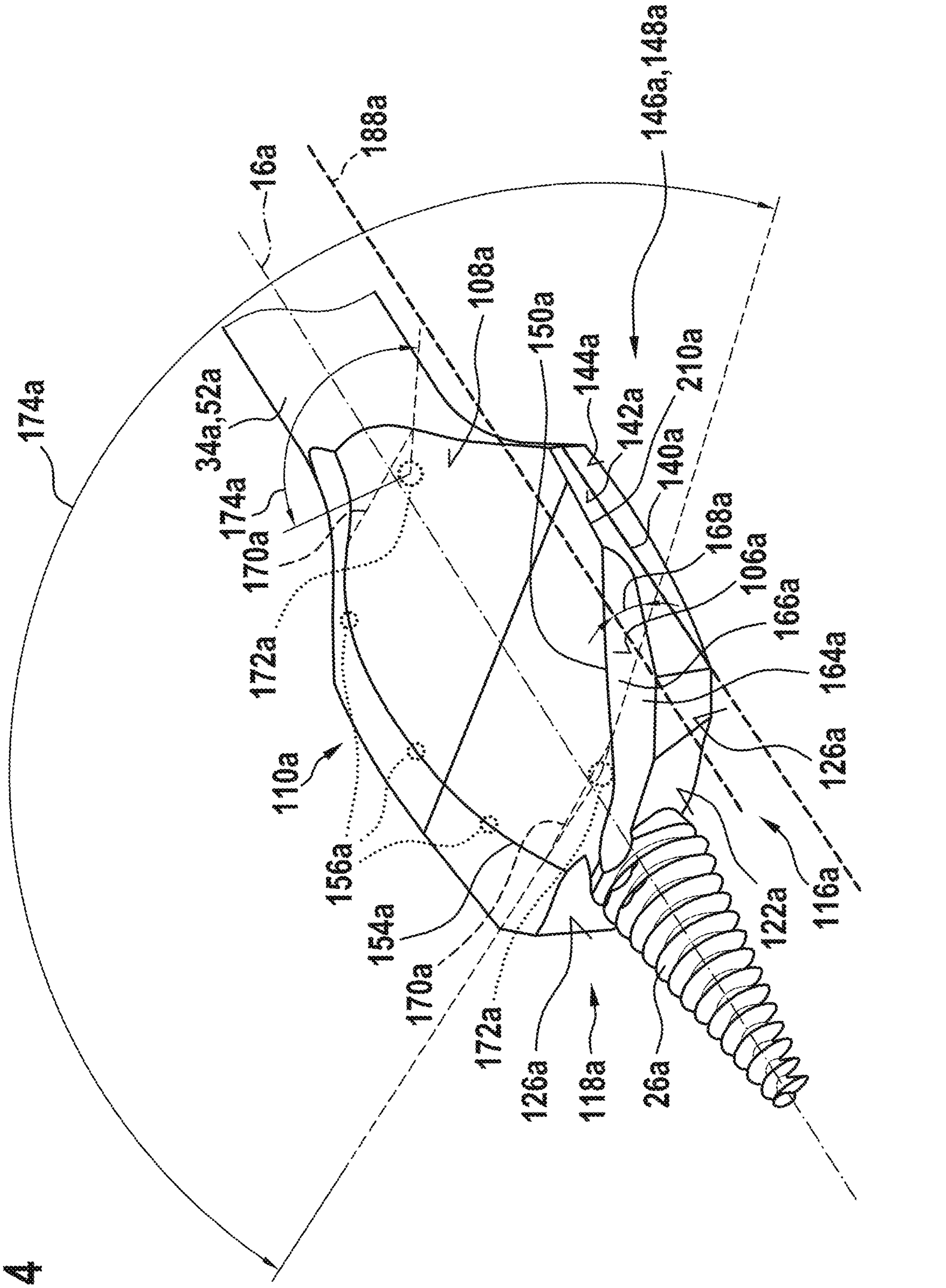

The chipping surface 106*a* is formed by a transition region 164*a* and a constant region 166*a*. The chipping surface 106*a* forms a constant chipping angle 168*a* of 18° to the rotation axis 16*a* at an end of the chipping surface 106*a* facing the drill tip 26*a*, in particular with a maximum tolerance of 4° (see FIG. 4). In particular, FIG. 4 shows an auxiliary line 188*a*, which runs parallel to the rotation axis 16*a*. The transition region 164*a* is rounded. The chipping surface 106*a* forms a constant chipping angle 168*a* of 18° to the rotation axis 16*a*, in particular in relation to the chip conveying surface 108*a*, except in the rounded transition region 164*a* of the chipping surface 106*a*, in particular with a maximum tolerance of 4°. The constant region 166*a* is a region of the chipping surface 106*a* with a planar outer surface, which, in particular, forms the constant chipping angle 168*a* of 18°. The transition region 164*a* is a region of the chipping surface 106*a* in which the chipping surface 106*a* is bent, in particular rounded, in particular to form a gliding transition for chips from the chipping surface 106*a* to the chip conveying surface 108*a*.

The transition region 164*a* is formed as an inward curved region, in particular in relation to the cutting body 18*a*, of the chipping surface 106*a*, with a center point of a rounded region arranged in particular outside of the cutting body 18*a*, in particular on a side of the cutting body 18*a* that faces the corresponding cutting surface 106*a*. The constant region 166*a* is formed as an inward angled region, in particular in relation to the cutting body 18*a*, preferably at the cutting angle 168*a* of 18° to the rotation axis 16*a*, in particular with a maximum tolerance of 4°, of the cutting surface 106*a*. The transition region 164*a* of the chipping surface 106*a* is formed as an inward rounded region of the chipping surface 106*a*.

The chipping surface 106*a* extends more than half as far along the rotation axis 16*a* as the maximum extension 192*a*, in particular the maximum diameter 14*a*, of the cutting body 18*a* perpendicular to the rotation axis 16*a*, at the radial outer surfaces 142*a*, 144*a*. The cutting surface 106*a* extends radially from a center of the sheath outer side 110*a*, in particular the cutting body 18*a*, to an end of the sheath outer side 110*a*, in particular the cutting body 18*a*.

The chipping surface 106*a* is delimited from the chip conveying surface 108*a* by the boundary edge 150*a*. The boundary edge 150*a* is formed as a protruding edge. The boundary edge 150*a* extends at least partially between the transition region 164*a* of the chipping surface 106*a* and the chip conveying surface 108*a*.

The chip conveying surface 108*a* has less of a concave curvature at an end facing the drill tip 26*a* than at an end of the chip conveying surface 108*a* facing the drill shank 30*a*. The two chip conveying surfaces 108*a* as viewed along the maximum extension 192*a* of the cutting body 18*a* perpendicular to the rotation axis 16*a*, in particular the maximum diameter 14*a*, are formed curved partially concavely, in particular curved inward in relation to the cutting body 18*a*, and partially convexly, in particular curved outward in relation to the cutting body 18*a*.

In each cross-section parallel to the drill plane 74*a*, in particular perpendicular to the rotation axis 16*a*, the chip conveying surface 108*a* has a point, in particular a low point 172*a*, which is arranged farthest away from an imaginary connecting line 170*a* of the, in particular radial, end points of the chip conveying surface 108*a* (as schematically indicated in FIG. 2). The low points 172*a* of the chip conveying surface 108*a* are less far away from the imaginary connecting line 170*a* of the, in particular radial, end points of the chip conveying surface 108*a* in an end region facing the drill tip 26*a*, in particular of the chip conveying surface 108*a*, on average over the end region than at an end region of the chip conveying surface 108*a* that faces the drill shank 30*a*.

In the cross-section perpendicular to the rotation axis 16*a*, the chip conveying surface 108*a* has a locally convex shape in a region between an end point facing the rotation axis 16*a* and the low point 172*a*. An opening angle 174*a* measured in a cross-section perpendicular to the rotation axis 16*a* at the respective low point 172*a* is greater in the end region of the chip conveying surface 108*a* that faces the drill tip 26*a* than at the end region of the chip conveying surface 108*a* that faces the drill shank 30*a*. A change in the opening angle 174*a* of the chip conveying surface 108*a* as viewed along the rotation axis 16*a* starting at the drill tip 26*a* is formed so that it decreases at a constant rate.

Figure 5:
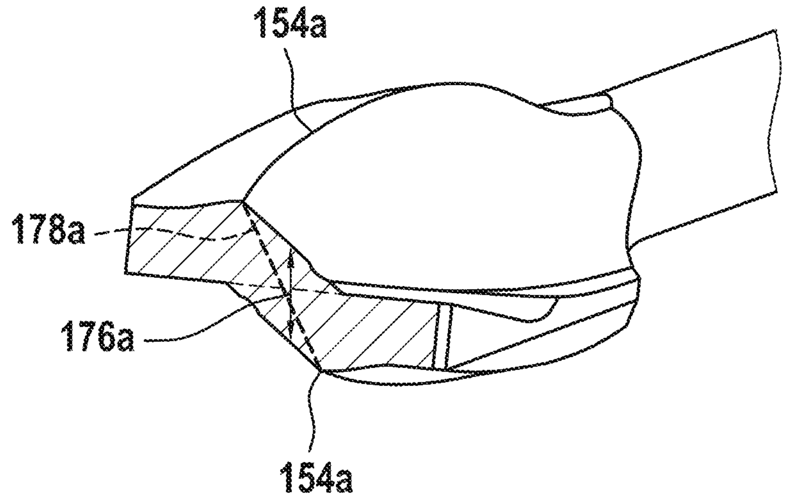

In a cross-section perpendicular to the rotation axis 16*a*, the cutting body 18*a* has a maximum thickness 176*a* in a body region facing the drill tip 26*a*, which maximum thickness is oriented perpendicular to the rotation axis 16*a* and, up to a deviation of at most 15°, perpendicular to the maximum extension 192*a* of the cutting body 18*a* perpendicular to the rotation axis 16*a*, and which intersects an imaginary connecting axis 178*a* through the raised edges 154*a* in the cross-section (see FIG. 5). The maximum thickness 176*a* of the cutting body 18*a* is oriented perpendicular to the rotation axis 16*a* and, up to a maximum deviation of 15, perpendicular to the maximum extension 192*a* of the cutting body 18*a*, perpendicular to the rotation axis. The imaginary connecting axis 178*a* through the raised edges 154*a* intersects the maximum thickness 176*a* of the cutting body 18*a* at exactly one point in each cross-section perpendicular to the rotation axis 16*a*, in particular in the central 75% of the cutting body 18*a* as measured by volume along the rotation axis 16*a*. The body region comprises a maximum of 75% of the cutting body 18*a* by volume from an end of the cutting body 18*a* that faces the drill tip 26*a*. In order to provide a better overview, not all reference numbers are given in FIGS. 5 to 20.

Figure 6:
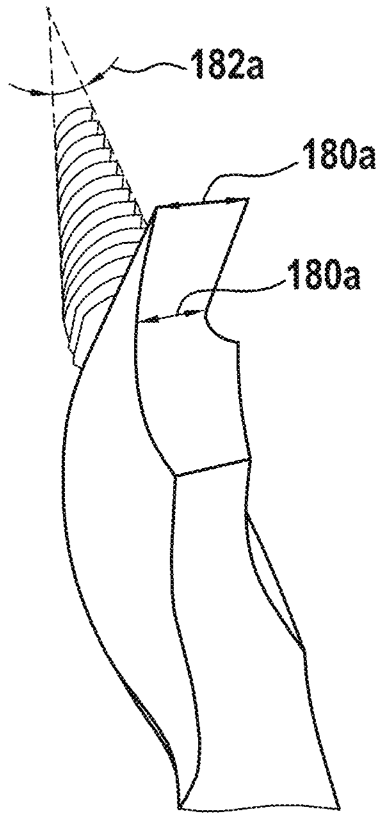

The cutting wings 66*a*, 68*a*, in a cross-section perpendicular to the rotation axis 16*a* and up to a deviation of no more than 15° perpendicular to a largest extension 192*a* of the cutting body 18*a* perpendicular to the rotation axis 16*a*, in a central region of the extension 152*a* of the cutting body 18*a* along the rotation axis 16*a*, in particular in the central 30% of the cutting body 18*a* as measured by volume along the rotation axis 16*a*, have a lesser extension 180*a* perpendicular to the rotation axis 16*a* and up to a deviation of no more than 15° perpendicular to the greatest extension 192*a*, in particular to the maximum diameter 14*a*, of the cutting body 18*a* perpendicular to the rotation axis 16*a*, than in an end region of the cutting body 18*a* that faces the drill tip 26*a* (see FIG. 6).

The two cutting wings 66*a*, 68*a*, in each case in a cross-section up to a deviation of no more than 15° perpendicular to the greatest extension 192*a* of the cutting body 18*a* perpendicular to the rotation axis 16*a* in the middle region of the maximum extension 152*a* of the cutting body 18*a* along the rotation axis 16*a*, in particular in the middle 30% of the cutting body 18*a* measured by volume along the rotation axis 16*a*, have a lesser extension 180*a* perpendicular to the rotation axis 16*a* and up to a deviation of at most 15° perpendicular to the largest extension 192*a* of the cutting body 18*a* perpendicular to the rotation axis 16*a* than in an end region of the cutting body 18*a* facing the drill tip 26*a*, in particular due to the design of the cutting surface 106*a*.

The drill tip 26*a* comprises a thread 48*a* with a defined thread length. The drill tip 26*a* is materially symmetrical about the rotation axis 16*a* apart from the thread 48*a*, and apart from deviations of no more than 10% by volume. The drill tip 26*a* forms an end of the drilling unit 34*a* that faces away from the drill shank 30*a*. The drill tip 26*a* has a thread 48*a* with a defined thread length of at least 12 mm, in particular up to a maximum tolerance of 1 mm. The drill tip 26*a* comprises a thread 48*a* with a defined thread length of a maximum of 20 mm, in particular up to a maximum tolerance of 1 mm. The drill tip 26*a* has a defined maximum diameter 90*a*. The drill tip 26*a* has a defined maximum diameter 90*a* of at least 6 mm, in particular within a tolerance of a maximum of 0.1 mm. The drill tip 26*a* has a defined maximum diameter 90*a* of a maximum of 8 mm, in particular within a tolerance of a maximum of 0.1 mm. A ratio of the threaded length of the drill tip 26*a* to the maximum diameter 90*a* of the drill tip 26*a* is greater than 2.1, in particular rounded to two decimal places. A ratio of the thread length of the drill tip 26*a* to the maximum diameter 90*a* of the drill tip 26*a* is less than 2.35, in particular rounded to two decimal places. A smallest ratio of the maximum diameter 90*a* of the drill tip 26*a* to the diameter 88*a* of the shank body 52*a* is greater than 0.50, in particular more than 0.60, in particular more than 0.66, in particular rounded to two decimal places.

The smallest length ratio of a maximum length of the drill tip 26*a* along the rotation axis 16*a* to a maximum length of the wood-drilling device 10*a*, in particular the drilling unit 34*a*, along the rotation axis 16*a* is at least 0.075. The wood-drilling device 10*a*, in particular the drilling unit 34*a*, has a defined maximum length of a maximum of 156 mm along the rotation axis 16*a*, in particular with a tolerance of 3 mm. The smallest length ratio of a maximum length of the drill tip 26*a* along the rotation axis 16*a* to a maximum length of the wood-drilling device 10*a*, in particular the drilling unit 34*a*, along the rotation axis 16*a* is a maximum of 0.117, in particular rounded to three decimal places.

The drill tip 26*a* has a thread pitch of a maximum of 1.6 mm. The drill tip 26*a* has a length of at least 12 mm. The drill tip 26*a* has a length of a maximum of 20 mm. The drill tip 26*a* has a thread depth of at least 1.0 mm or 1.1 mm. The drill tip 26*a* has a threading angle of at least 40°. The drill tip 26*a*, in particular the thread 48*a* of the drill tip 26*a*, has a threading angle of 50°.

A ratio of the threaded pitch of the drill tip 26*a* to the threaded depth of the drill tip 26*a* amounts to a maximum of 1.25, in particular rounded to two decimal places.

A smallest length ratio of a maximum length of the drill tip 26*a* along the rotation axis 16*a* to a maximum length of the cutting body 18*a* along the rotation axis 16*a* is at least 0.25, in particular more than 0.5. In particular, the cutting body 18*a* has a short but solid body, in particular as compared to the drill tip 26*a*. The cutting body 18*a* has a maximum length of at least 25 mm along the rotation axis 16*a*, in particular with a maximum tolerance of 2 mm. The cutting body 18*a* has a maximum length of a maximum of 35 mm along the rotation axis 16*a*, in particular with a maximum tolerance of 2 mm. The drill tip 26*a* has a drill tip angle 182*a* of 17°, with a maximum tolerance of 3°.

The smallest length ratio of the maximum length of the drill tip 26*a* along the rotation axis 16*a* to the maximum length of the cutting body 18*a* along the rotation axis 16*a* is at least 0.3. The smallest ratio in length from the maximum length of the drill tip 26*a* along the rotation axis 16*a* to the maximum length of the cutting body 18*a* along the rotation axis 16*a* is a maximum of 0.8.

The first wood-drilling device 10*a* has a maximum thickness 176*a* of 16 mm, in particular with a maximum tolerance of 0.5 mm. The second wood-drilling device 12*a* has a defined maximum thickness 176*a* of 7.7 mm or 13 mm, in particular with a maximum tolerance of 0.5 mm.

The shank body 52*a* of the first wood-drilling device 10*a* has a uniform diameter 88*a* of 8.7 mm with a tolerance of 0.4 mm. The shank body 52*a* of the second wood-drilling device 12*a* has a uniform diameter 88*a* of 7.3 mm with a tolerance of 0.4 mm.

Figure 7:
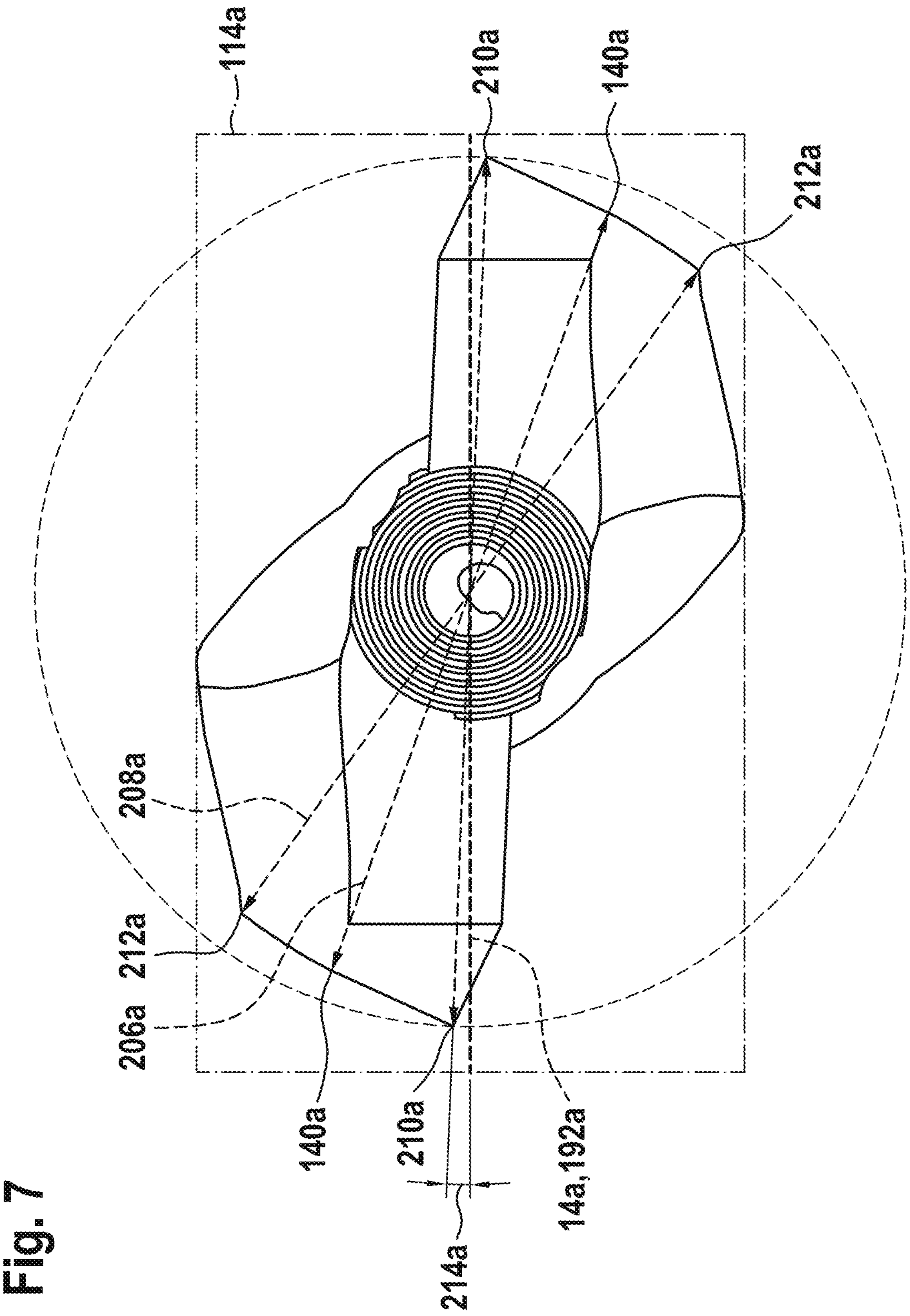

FIG. 7 shows the first wood-drilling device 10*a* in a top view along the rotation axis 16*a* on the drill tip 26*a*. FIG. 7 shows that the maximum extension 192*a* of the cutting body 18*a* perpendicular to the rotation axis 16*a* is an extension of the cutting body 18*a* from one of the radial outer edges 210*a* to the other radial outer edge 210*a*. An extension 206*a* of the cutting body 18*a* perpendicular to the rotation axis 16*a* from one of the radial edges 140*a* to the other radial edge 140*a* is shorter, in particular at least 5% of the maximum extension 192*a* of the cutting body 18*a* than the maximum extension 192*a* of the cutting body 18*a* perpendicular to the rotation axis 16*a*. An extension 208*a* of the cutting body 18*a* perpendicular to the rotation axis 16*a* from an outer edge that differs from the radial edges 140*a* and the radial outer edges 210*a*, in particular a second radial outer edge 212*a*, to another second radial outer edge 212*a* is shorter, in particular by at least 10% of the maximum extension 192*a* of the cutting body 18*a*, than the maximum extension 192*a* of the cutting body 18*a* perpendicular to the rotation axis 16*a*. The maximum extension 192*a* of the cutting body 18*a* perpendicular to the rotation axis 16*a* is aligned at an angle 214*a* of at least 2° to a greatest outer surface of the cuboid 114*a*, in particular as viewed along the rotation axis 16*a* (see FIG. 7). The radial outer edges 210*a* and the second radial outer edges 212*a* have a 4° angle to the rotation axis 16*a*, in particular with a tolerance of 2°.

Figure 8:
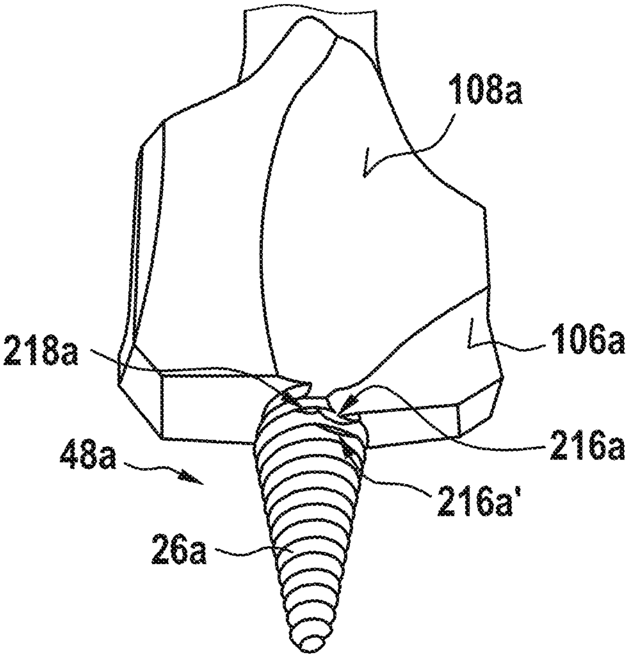

FIG. 8 shows that a bevel of the chipping surface 106*a* extends into the first two turns of the thread 48*a* of the drill bit 26*a* extending from the chipping surface 106*a*. The first two turns of the thread 48*a* of the drill tip 26*a* in each case have a chip recess 216*a*, 216'*a*, which in particular corresponds to the grind of the chipping surface 106*a*, due to which the drill tip 26*a* partially has a concave-round outer contour in a section perpendicular to the rotation axis 16*a*. The first turns of the thread 48*a* of the drill tip 26*a* have a chip recess 218*a*, which in particular corresponds to the grind of the chip conveying surface 108*a* 106, due to which the drill tip 26*a* partially has a concave outer contour in a section perpendicular to the rotation axis 16*a*.

Figure 9:
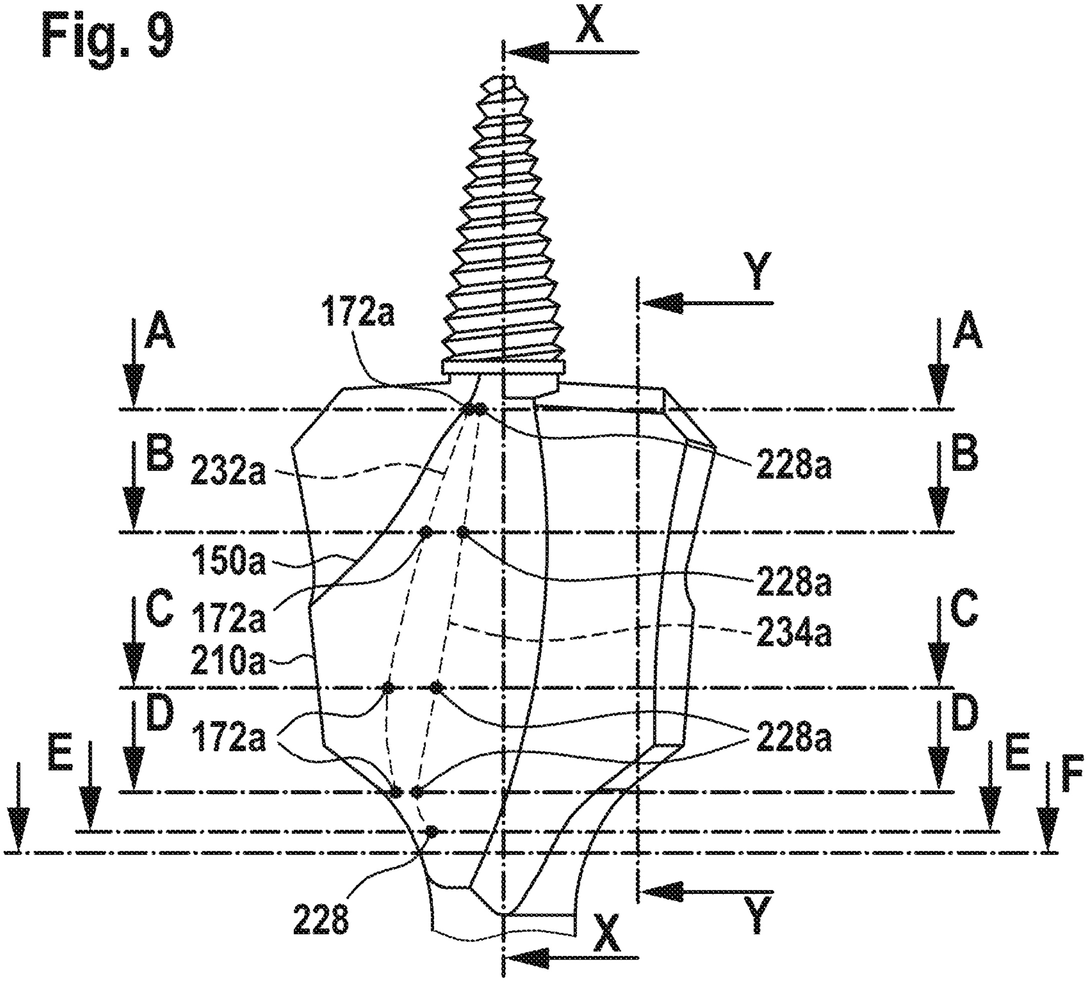

FIG. 9 shows an overview of sectional planes A-A, B-B, C-C, D-D, E-E, F-F through the cutting body 18*a* perpendicular to the rotation axis 16*a*, via a sectional plane X-X through the drilling unit 34*a* parallel to the rotation axis 16*a* and via a sectional plane Y-Y through the cutting body 18*a* parallel to the rotation axis 16*a*.

Figure 10:
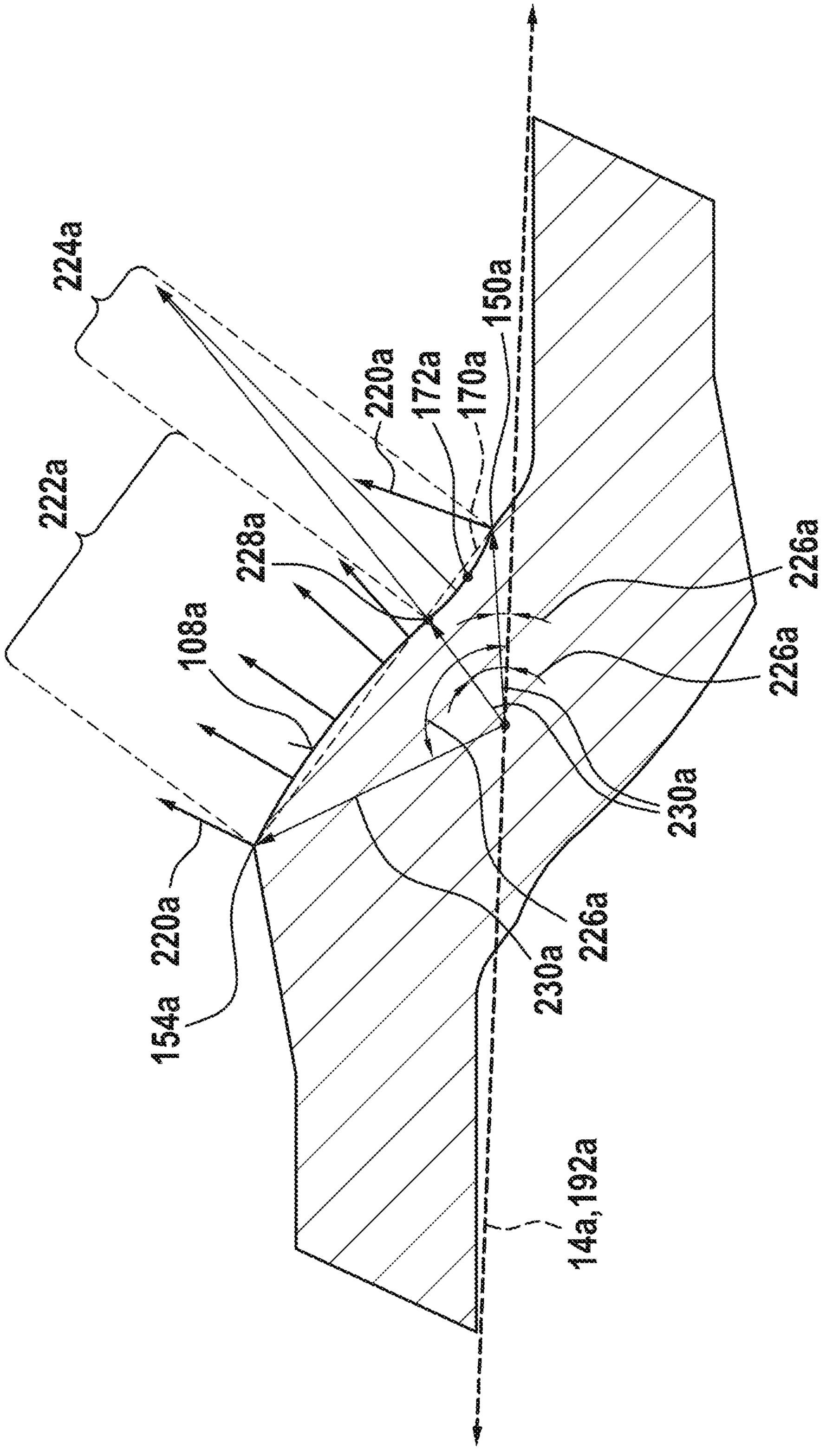

FIG. 10 shows the cutting body 18*a* in a sectional view along the A-A sectional plane.

In particular, the chip conveying surface 108*a* is shown in cross-section along the A-A sectional plane. As a guide, the maximum extension 192*a* of the cutting body 18*a* perpendicular to the rotation axis 16*a* is shown, which is not arranged in the cross-section along the A-A sectional plane.

Surface normals 220*a* are shown for a chip conveying surface 108*a* of the cutting body 18*a*. By way of example, for a better overview only the outer two surface normals 220*a* are provided with a reference number. In a convex partial surface 222*a* of the chip conveying surface 108*a*, adjacent surface normals 220*a* of the chip conveying surface 108*a* are aligned with each other away from the cutting body 18*a* and free of intersections. In the convex partial surface 222*a* of the chip conveying surface 108*a*, all surface normals 220*a* are directed to a fanning angle, in particular a space angle, in particular away from the cutting body 18*a*.

In a concave partial surface 224*a* of the chip conveying surface 108*a*, adjacent surface normals 220*a* of the chip conveying surface 108*a*, which are, in particular, directed away from the cutting body 18*a*, intersect.

In a polar coordinate system formed by the maximum extent 192*a* of the cutting body 18*a* and an axis oriented perpendicular to the maximum extent 192*a* of the cutting body 18*a* and perpendicular to the rotation axis 16*a*, the convex partial surface 222*a* is formed by points of the chip conveying surface 108*a* with an angle 226*a* in relation to the maximum extent 192*a* of the cutting body 18*a* of 35° to 112°, in the cross-section along the sectional plane A-A. In FIGS. 11 through 15, in each case three polar coordinates 230*a* are shown as examples.

The concave partial surface 224*a* is formed, in the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, by points of the chip conveying surface 108*a* with an angle 226*a* in relation to the maximum extension 192*a* of the cutting body 18*a* of 8° to 35°, in the cross-section along the sectional plane A-A.

The chip conveying surface 108*a*, in the cross-section along the sectional plane A-A, has an inflection point 228*a* where the convex partial surface 222*a* transitions into the concave partial surface 224*a*. At the inflection point 228*a*, the surface normal 220*a* is part of both the concave partial surface 222*a* and the convex partial surface 224*a*. The inflection point 228*a*, in the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, is formed by the point of the chip conveying surface 108*a* which has an angle 226*a* of 35° in relation to the maximum extension 192*a* of the cutting body 18*a*.

Figure 11:
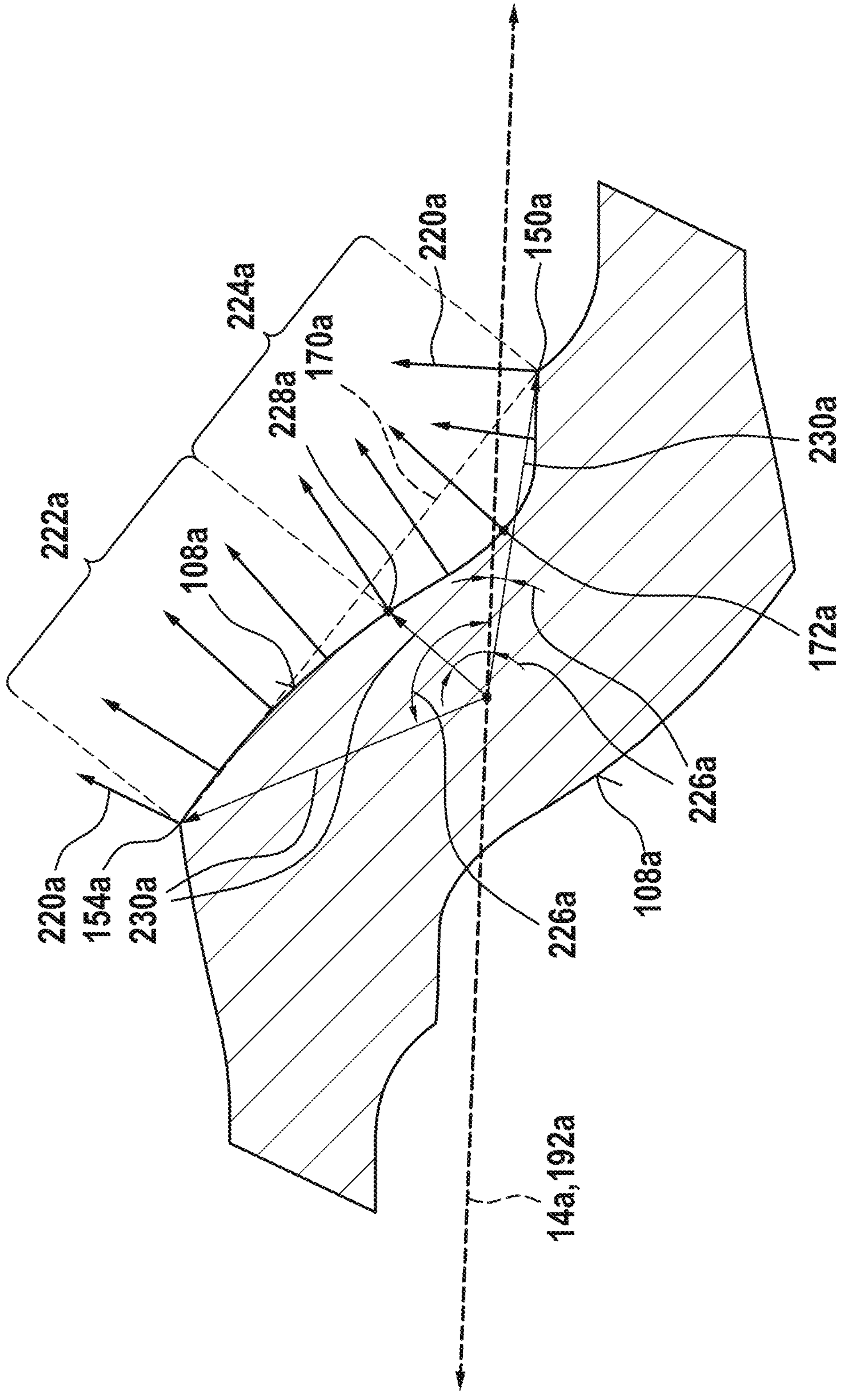

In the cross-section along the sectional plane A-A, the chip conveying surface 108*a* has the low point 172*a*, which is arranged farthest away from an imaginary connecting line 170*a* of the, in particular radial, end points of the chip conveying surface 108*a* (see FIG. 2 and FIG. 10). FIG. 11 shows the cutting body 18*a* in a sectional view along the B-B sectional plane.

In particular, the chip conveying surface 108*a* is shown in a cross-section along the B-B sectional plane. As a guide, the maximum extension 192*a* of the cutting body 18*a* perpendicular to the rotation axis 16*a*, which is not arranged in this section along the B-B sectional plane, is shown.

Surface normals 220*a* are shown for a chip conveying surface 108*a* of the cutting body 18*a*. By way of example, for a better overview only the outer two surface normals 220*a* are provided with a reference number. In a convex partial surface 222*a* of the chip conveying surface 108*a*, adjacent surface normals 220*a* of the chip conveying surface 108*a* are aligned with each other away from the cutting body 18*a* and free of intersections. In the convex partial surface 222*a* of the chip conveying surface 108*a*, all surface normals 220*a* are directed to a fanning angle, in particular a space angle, in particular away from the cutting body 18*a*.

In a concave partial surface 224*a* of the chip conveying surface 108*a*, adjacent surface normals 220*a* of the chip conveying surface 108*a*, which are, in particular, directed away from the cutting body 18*a*, intersect.

In a polar coordinate system formed by the maximum extent 192*a* of the cutting body 18*a* and an axis oriented perpendicular to the maximum extent 192*a* of the cutting body 18*a* and perpendicular to the rotation axis 16*a*, the convex partial surface 222*a* is formed by points of the chip conveying surface 108*a* with an angle 226*a* in relation to the maximum extent 192*a* of the cutting body 18*a* of 50° to 125°, in the cross-section along the sectional plane B-B.

The concave partial surface 224*a* is formed, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, by points of the chip conveying surface 108*a* with an angle 226*a* in relation to the maximum extension 192*a* of the cutting body 18*a* of 50° to −10°, in the cross-section along the sectional plane B-B.

In the cross-section along the sectional plane B-B, the chip conveying surface 108*a* has an inflection point 228*a* at which the convex partial surface 222*a* transitions to the concave partial surface 224*a*. At the inflection point 228*a*, the surface normal 220*a* is part of both the concave partial surface 222*a* and the convex partial surface 224*a*. The inflection point 228*a*, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, is formed by a point of the chip conveying surface 108*a* with an angle 226*a* of 50° in relation to the maximum extension 192*a* of the cutting body 18*a*.

In the cross-section along the sectional plane B-B, the chip conveying surface 108*a* has the low point 172*a*, which is arranged farthest away from an imaginary connecting line 170*a* of the, in particular radial, end points of the chip conveying surface 108*a* (see FIG. 2 and FIG. 11).

Figure 12:
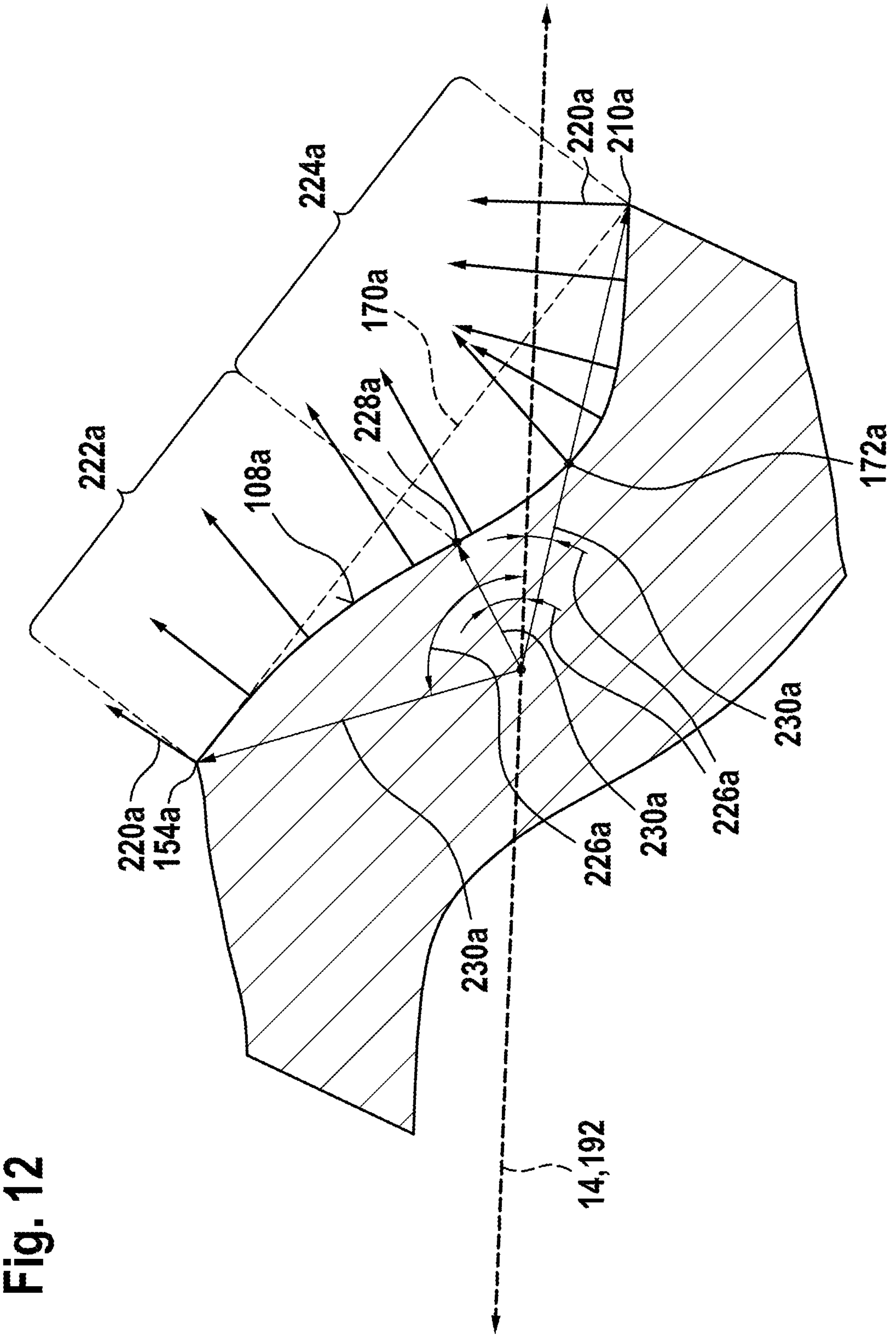

FIG. 12 shows the cutting body 18*a* in a sectional view along the C-C sectional plane.

In particular, the chip conveying surface 108*a* is shown in a cross-section along the C-C sectional plane. As a guide, the maximum extension 192*a* of the cutting body 18*a* perpendicular to the rotation axis 16*a* is shown, which is not arranged in this section along the C-C sectional Surface normals 220*a* are shown for a chip conveying surface 108*a* of the cutting body 18*a*. By way of example, for a better overview only the outer two surface normals 220*a* are provided with a reference number. In a convex partial surface 222*a* of the chip conveying surface 108*a*, adjacent surface normals 220*a* of the chip conveying surface 108*a* are aligned with each other away from the cutting body 18*a* and free of intersections. In the convex partial surface 222*a* of the chip conveying surface 108*a*, all surface normals 220*a* are directed to a fanning angle, in particular a space angle, in particular away from the cutting body 18*a*.

In a concave partial surface 224*a* of the chip conveying surface 108*a*, adjacent surface normals 220*a* of the chip conveying surface 108*a*, which are, in particular, directed away from the cutting body 18*a*, intersect.

In a polar coordinate system formed by the maximum extent 192*a* of the cutting body 18*a* and an axis oriented perpendicular to the maximum extent 192*a* of the cutting body 18*a* and perpendicular to the rotation axis 16*a*, the convex partial surface 222*a* is formed by points of the chip conveying surface 108*a* with an angle 226*a* in relation to the maximum extent 192*a* of the cutting body 18*a* of 30° to 111°, in the cross-section along the sectional plane C-C.

The concave partial surface 224*a* is formed, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, by points of the chip conveying surface 108*a*, which have an angle 226*a*, which is intermediate to the maximum extension 192*a* of the cutting body 18*a* of 30° to −17°, in the cross-section along the sectional plane C-C.

The chip conveying surface 108*a* has an inflection point 228*a* in the cross-section along the sectional plane C-C, at which the convex partial surface 222*a* transitions into the concave partial surface 224*a*. At the inflection point 228*a*, the surface normal 220*a* is part of both the concave partial surface 222*a* and the convex partial surface 224*a*. The point of inflection 228*a*, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, is formed by a point of the chip conveying surface 108*a* with an angle 226*a* of 30° in relation to the maximum extension 192*a* of the cutting body 18*a*.

In the cross-section along the sectional plane C-C, the chip conveying surface 108*a* has the low point 172*a*, which is arranged farthest away from an imaginary connecting line 170*a* of the, in particular radial, end points of the chip conveying surface 108*a* (see FIG. 2 and FIG. 12).

Figure 13:
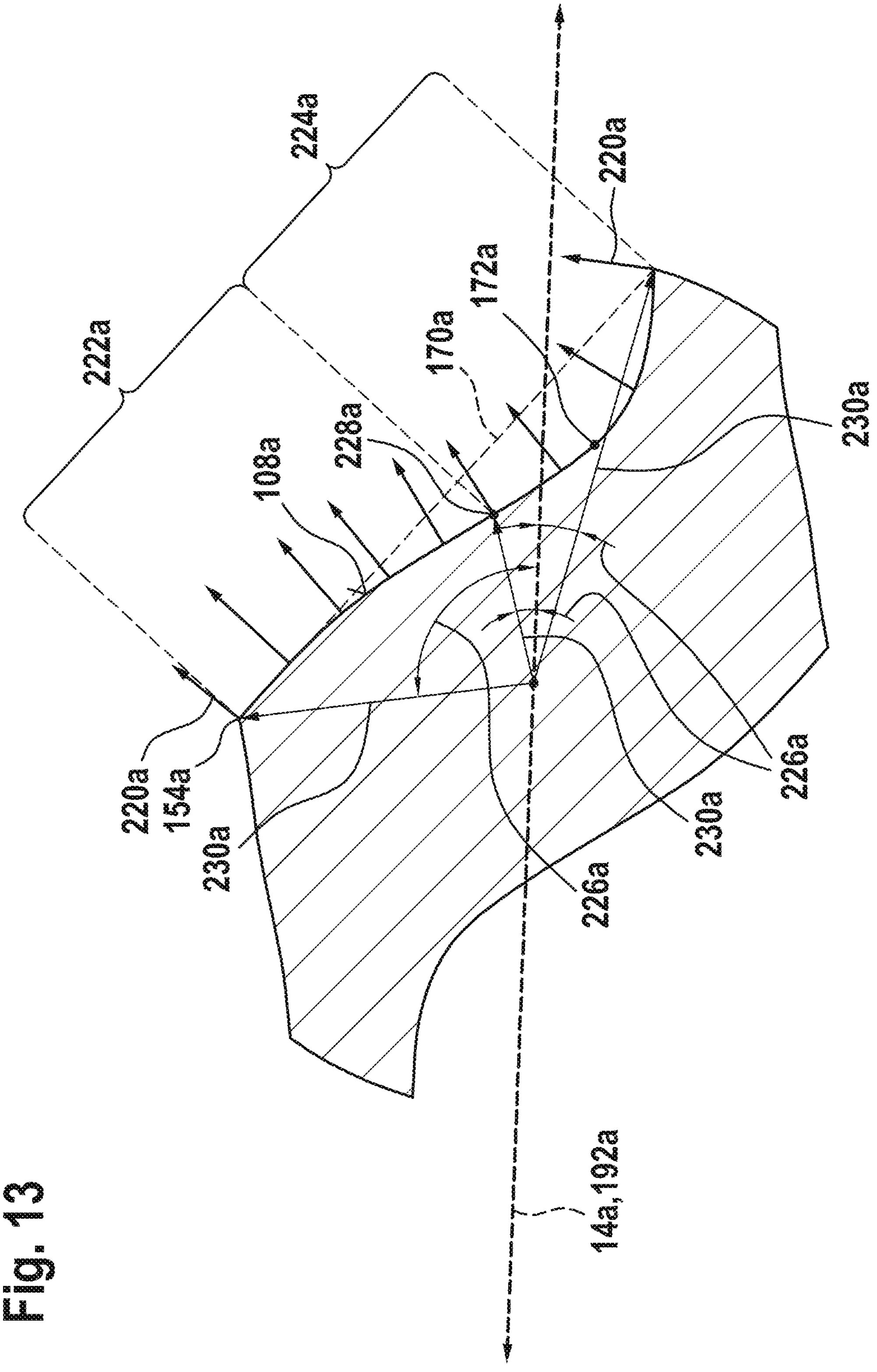

FIG. 13 shows the cutting body 18*a* in a sectional view along the D-D sectional plane.

In particular, the chip conveying surface 108*a* is shown in a cross-section along the D-D sectional plane. As a guide, the maximum extension 192*a* of the cutting body 18*a* perpendicular to the rotation axis 16*a*, which is not arranged in the cross-section along the D-D sectional plane, is shown.

Surface normals 220*a* are shown for a chip conveying surface 108*a* of the cutting body 18*a*. By way of example, for a better overview only the outer two surface normals 220*a* are provided with a reference figure. In a convex partial surface 222*a* of the chip conveying surface 108*a*, adjacent surface normals 220*a* of the chip conveying surface 108*a* are aligned with each other away from the cutting body 18*a* and free of intersections. In the convex partial surface 222*a* of the chip conveying surface 108*a*, all surface normals 220*a* are directed to a fanning angle, in particular a space angle, in particular away from the cutting body 18*a*.

In a concave partial surface 224*a* of the chip conveying surface 108*a*, adjacent surface normals 220*a* of the chip conveying surface 108*a*, which are, in particular, directed away from the cutting body 18*a*, intersect.

In a polar coordinate system formed by the maximum extent 192*a* of the cutting body 18*a* and an axis oriented perpendicular to the maximum extent 192*a* of the cutting body 18*a* and perpendicular to the rotation axis 16*a*, the convex partial surface 222*a* is formed by points of the chip conveying surface 108*a* with an angle 226*a* in relation to the maximum extent 192*a* of the cutting body 18*a* of 15° to 103°, in the cross-section along the sectional plane D-D.

The concave partial surface 224*a* is formed, in the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, by points of the chip conveying surface 108*a* with an angle 226*a* in relation to the maximum extension 192*a* of the cutting body 18*a* of 15° to −19°, in the cross-section along the sectional plane D-D.

In the cross-section along the sectional plane D-D, the chip conveying surface 108*a* has an inflection point 228*a* at which the convex partial surface 222*a* transitions to the concave partial surface 224*a*. At the inflection point 228*a*, the surface normal 220*a* is part of both the concave partial surface 222*a* and the convex partial surface 224*a*. The point of inflection 228*a*, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, is formed by a point of the chip conveying surface 108*a* with an angle 226*a* of 15° in relation to the maximum extension 192*a* of the cutting body 18*a*.

In the cross-section along the sectional plane D-D, the chip conveying surface 108*a* has the low point 172*a*, which is arranged farthest away from an imaginary connecting line 170*a* of the, in particular radial, end points of the chip conveying surface 108*a* (see FIG. 2 and FIG. 13).

Figure 14:
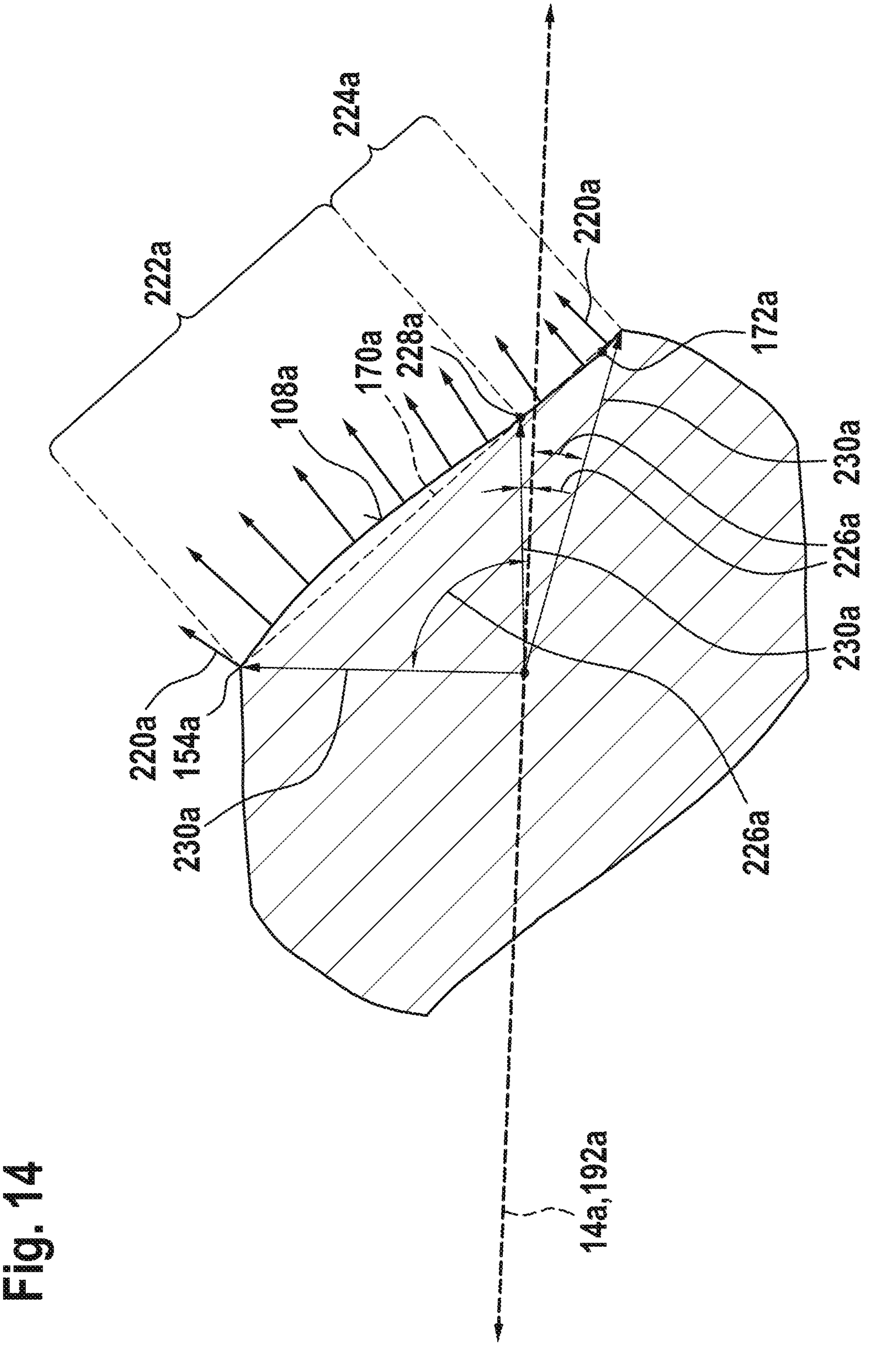

FIG. 14 shows the cutting body 18*a* in a sectional view along the E-E sectional plane.

In particular, the chip conveying surface 108*a* is shown in a cross-section along the E-E sectional plane. As a guide, the maximum extension 192*a* of the cutting body 18*a* perpendicular to the rotation axis 16*a*, which is not arranged in the cross-section along the E-E sectional plane, is shown.

Surface normals 220*a* are shown for a chip conveying surface 108*a* of the cutting body 18*a*. By way of example, for a better overview only the outer two surface normals 220*a* are provided with a reference figure. In a convex partial surface 222*a* of the chip conveying surface 108*a*, adjacent surface normals 220*a* of the chip conveying surface 108*a* are aligned with each other away from the cutting body 18*a* and free of intersections. In the convex partial surface 222*a* of the chip conveying surface 108*a*, all surface normals 220*a* are directed to a fanning angle, in particular a space angle, in particular away from the cutting body 18*a*.

In a concave partial surface 224*a* of the chip conveying surface 108*a*, adjacent surface normals 220*a* of the chip conveying surface 108*a*, which are, in particular, directed away from the cutting body 18*a*, intersect.

In a polar coordinate system formed by the maximum extent 192*a* of the cutting body 18*a* and an axis oriented perpendicular to the maximum extent 192*a* of the cutting body 18*a* and perpendicular to the rotation axis 16*a*, the convex partial surface 222*a* is formed by points of the chip conveying surface 108*a* with an angle 226*a* in relation to the maximum extent 192*a* of the cutting body 18*a* of 1° to 87°, in the cross-section along the sectional plane E-E.

The concave partial surface 224*a* is formed, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, by points of the chip conveying surface 108*a* with an angle 226*a* in relation to the maximum extension 192*a* of the cutting body 18*a* of 1° to −14°, in the cross-section along the sectional plane E-E.

The chip conveying surface 108*a* has an inflection point 228*a* in the cross-section along the sectional plane E-E, at which the convex partial surface 222*a* transitions to the concave partial surface 224*a*. At the inflection point 228*a*, the surface normal 220*a* is part of both the concave partial surface 222*a* and the convex partial surface 224*a*. The point of inflection 228*a*, within the polar coordinate system formed in particular by the maximum extension 192*a* of the cutting body 18*a* and an axis oriented perpendicular to the maximum extension 192*a* of the cutting body 18*a* and perpendicular to the rotation axis 16*a*, is formed by a point of the chip conveying surface 108*a* with an angle 226*a* of 1° in relation to the maximum extension 192*a* of the cutting body 18*a*.

In the cross-section along the sectional plane E-E, the chip conveying surface 108*a* has the low point 172*a*, which is arranged farthest away from an imaginary connecting line 170*a* of the, in particular radial, end points of the chip conveying surface 108*a* (see FIG. 2 and FIG. 14).

Figure 15:
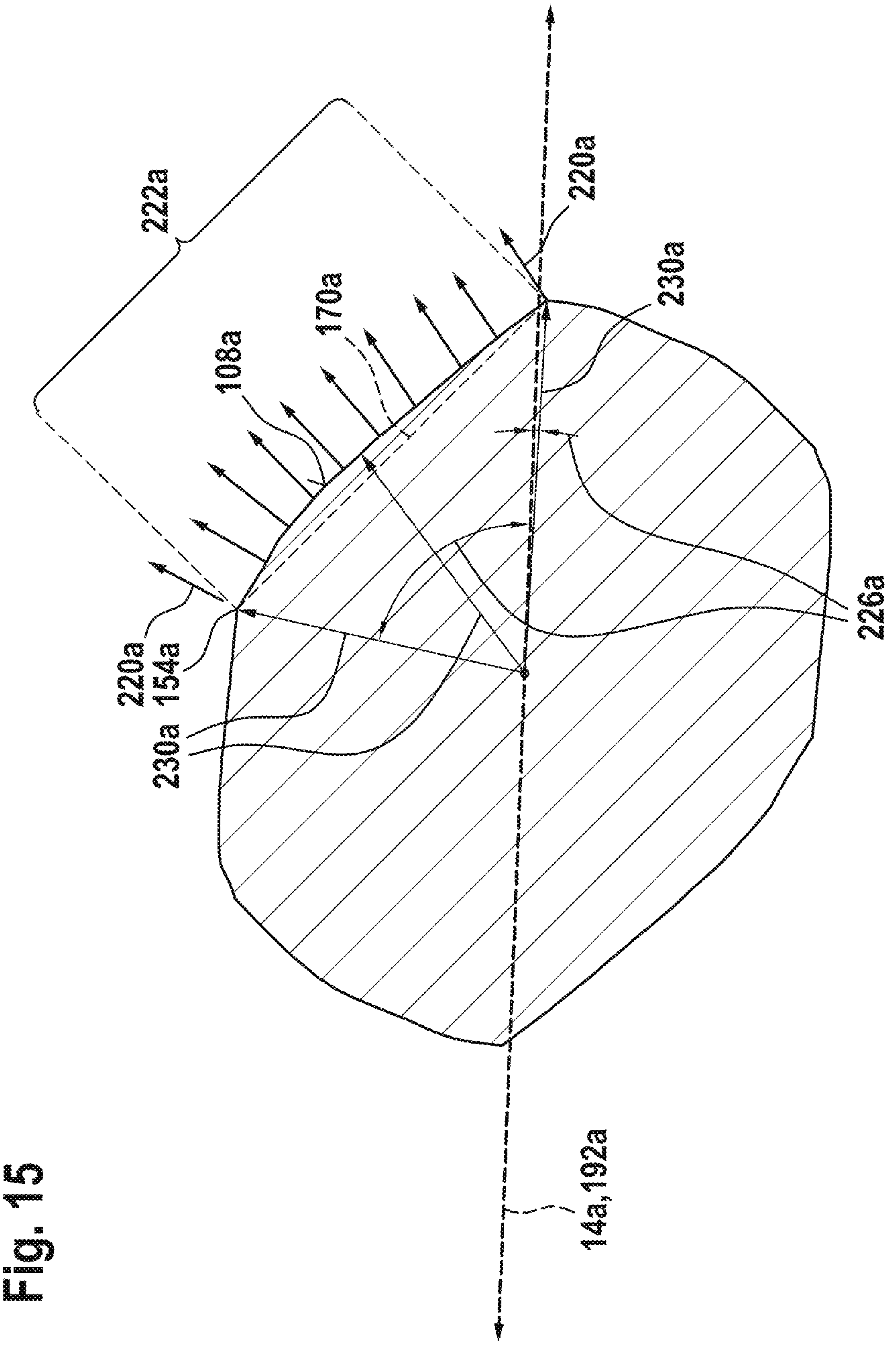

FIG. 15 shows the cutting body 18*a* in a sectional view along the F-F sectional plane.

In particular, the chip conveying surface 108*a* is shown in cross-section along the F-F sectional plane. As a guide, the maximum extension 192*a* of the cutting body 18*a* perpendicular to the rotation axis 16*a* is shown, which is not arranged in this section along the F-F sectional plane.

Surface normals 220*a* are shown for a chip conveying surface 108*a* of the cutting body 18*a*. By way of example, for a better overview only the outer two surface normals 220*a* are provided with a reference number. In a convex partial surface 222*a* of the chip conveying surface 108*a*, adjacent surface normals 220*a* of the chip conveying surface 108*a* are aligned with each other away from the cutting body 18*a* and free of intersections. In the convex partial surface 222*a* of the chip conveying surface 108*a*, all surface normals 220*a* are directed to a fanning angle, in particular a space angle, in particular away from the cutting body 18*a*. The chip conveying surface 108*a* is completely formed by the convex partial surface 222*a* in the cross-section along the sectional plane F-F.

In a polar coordinate system formed by the maximum extent 192*a* of the cutting body 18*a* and an axis oriented perpendicular to the maximum extent 192*a* of the cutting body 18*a* and perpendicular to the rotation axis 16*a*, the convex partial surface 222*a* is formed by points of the chip conveying surface 108*a* with an angle 226*a* in relation to the maximum extent 192*a* of the cutting body 18*a* of −5° to 72°, in the cross-section along the sectional plane F-F.

In FIG. 9, the low points 172*a* of the chip conveying surface 108*a* are schematically identified in each of the cross-sections of FIGS. 10 to 14 and connected to an imaginary low point line 232*a*.

The low point line 232*a* takes a curved path as viewed along the rotation axis 16*a*. The low points 172*a* of the chip conveying surface 108*a* are arranged at an end of the cutting body 18*a* that faces the drill tip 26*a* closer to an edge, in particular the boundary edge 150*a* or the radial outer edge 210*a*, of the chip conveying surface 108*a* that is radially distant from the rotation axis 16*a* than in the middle region of the maximum extension 152*a* of the cutting body 18*a* along the rotation axis 16*a*, in particular in the middle 50% of the cutting body 18*a* as measured by volume along the rotation axis 16*a*, wherein the proximity is, in particular, measured as a percentage in relation to the total extension of the chip conveying surface 108*a* perpendicular to the rotation axis 16*a*.

The low points 172*a* of the chip conveying surface 108*a* are arranged at an end of the cutting body 18*a* that faces the drill shank 30*a* closer to an edge, in particular the boundary edge 150*a* or the radial outer edge 210*a*, of the chip conveying surface 108*a* that is radially distant from the rotation axis 16*a* than in the middle region of the maximum extension 152*a* of the cutting body 18*a* along the rotation axis 16*a*, in particular in the middle 50% of the cutting body 18*a* as measured by volume along the rotation axis 16*a*, wherein the proximity is, in particular, measured as a percentage in relation to the total extension of the chip conveying surface 108*a* perpendicular to the rotation axis 16*a*.

In FIG. 9, the inflection points 228*a* of the chip conveying surface 108*a* from each of the cross-sections of FIGS. 10 through 14 are schematically identified, and connected to an imaginary inflection point line 234*a* extending along the rotation axis 16*a* across the chip conveying surface 108*a*.

The inflection point line 234*a* takes a curved path as viewed along the rotation axis 16*a*. The inflection points 228*a* of the chip conveying surface 108*a* are arranged at an end of the cutting body 18*a* that faces the drill tip 26*a* closer to an edge, in particular the boundary edge 150*a* or radial outer edge 210*a*, of the chip conveying surface 108*a*, radially distant from the rotation axis 16*a*, than in the middle region of the maximum extension 152*a* of the cutting body 18*a* along the rotation axis 16*a*, in particular in the middle 50% of the cutting body 18*a* measured by volume along the rotation axis 16*a*, wherein the proximity is, in particular, measured as a percentage in relation to the total extension of the chip conveying surface 108*a* perpendicular to the rotation axis 16*a*.

The inflection points 228*a* of the chip conveying surface 108*a* are arranged at an end of the cutting body 18*a* that faces the drill shank 30*a* closer to an edge, in particular the boundary edge 150*a* or the radial outer edge 210*a*, of the chip conveying surface 108*a*, radially distant from the rotation axis 16*a*, than in the middle region of the maximum extension 152*a* of the cutting body 18*a* along the rotation axis 16*a*, in particular in the middle 50% of the cutting body 18*a* as measured by volume along the rotation axis 16*a*, wherein the proximity is, in particular, measured as a percentage in relation to the total extension of the chip conveying surface 108*a* perpendicular to the rotation axis 16*a*.

Figure 16:
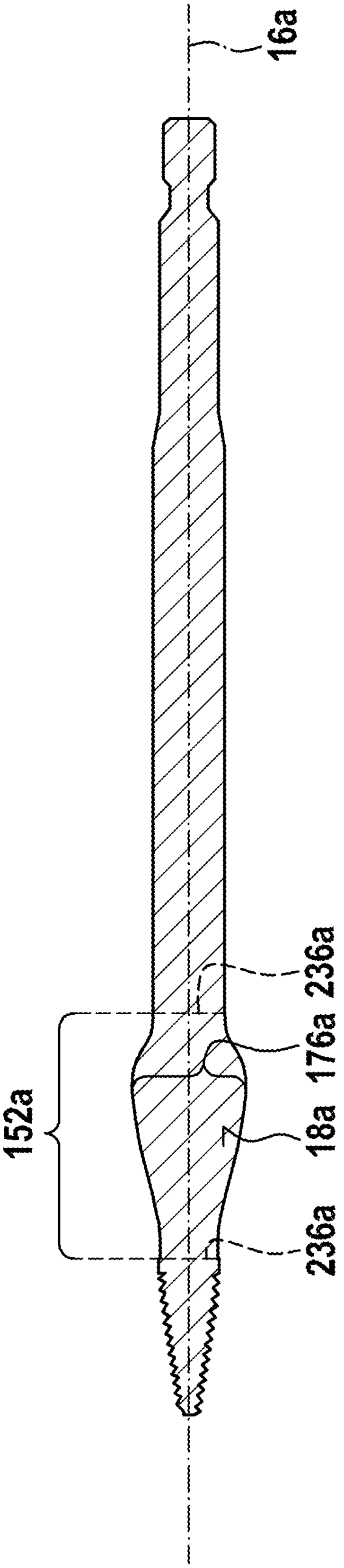

FIG. 16 shows the cutting body 18*a* in a sectional view along the X-X sectional plane (see FIG. 9).

In particular, the cutting body 18*a* is shown in a cross-section along the X-X sectional plane. As a guide, the rotation axis 16*a* is shown in FIG. 16. Additionally, the cutting body 18*a* is labeled with two imaginary boundary lines 236*a*.

The maximum thickness 176*a* of the cutting body 18*a* is spaced apart from a center of the cutting body 18*a* along the rotation axis 16*a*. The maximum thickness 176*a* of the cutting body 18*a* is arranged in a half that faces the drill shank 30*a*, in particular as measured by distance along the rotation axis 16*a*, of the cutting body 18*a*. The maximum thickness 176*a* of the cutting body 18*a* is arranged in a third that faces the drill shank 30*a*, in particular as measured by distance along the rotation axis 16*a*, of the cutting body 18*a*.

Figure 17:
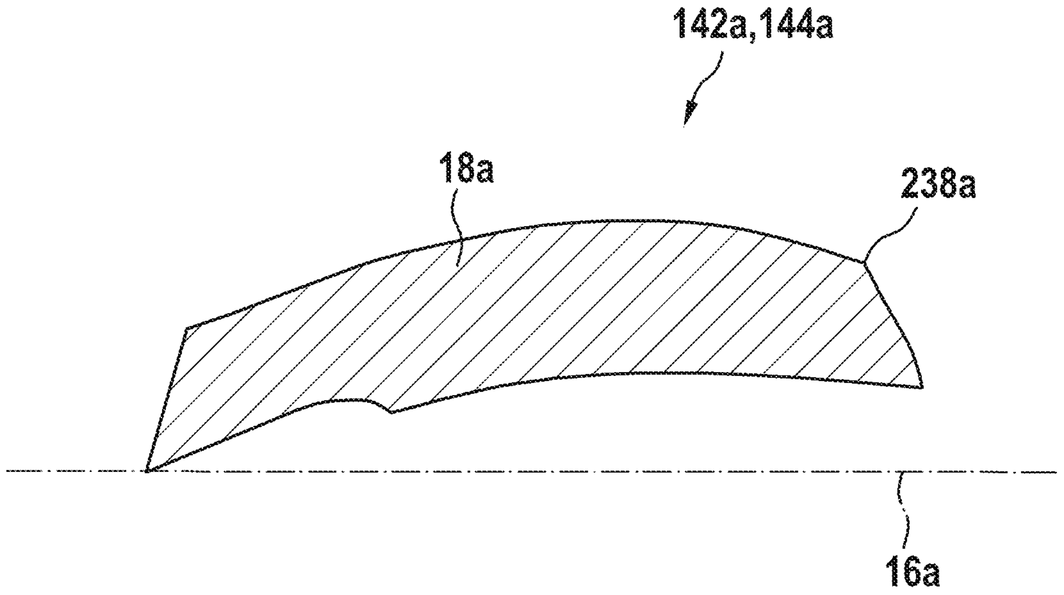

FIG. 17 shows the cutting body 18*a* in a sectional view along the Y-Y sectional plane (see FIG. 9).

In particular, the cutting body 18*a* is shown in a cross-section along the Y-Y sectional plane. As a guide, the rotation axis 16*a* is shown in FIG. 16.

The cutting body 18*a*, in particular the cutting wings 66*a*, 68*a*, has a shank side edge 238*a* on a side that faces the drill shank 30*a*, which is adjacent to the radial outer surfaces 142*a*, 144*a*.

Figure 18:
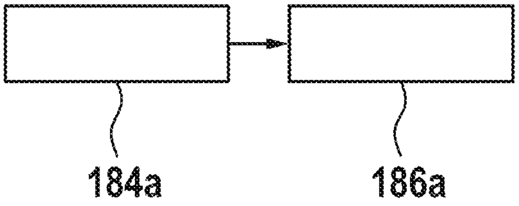

FIG. 18 schematically shows a method of producing the wood-drilling devices 10*a*, 12*a*.

In a method step, in particular, a forging step 184*a*, the drilling unit 34*a*, 36*a*, in particular the drill shank 30*a*, 32*a*, the cutting body 18*a*, 24*a* and the drill tip 26*a*, 28*a*, are forged from a drill head blank, wherein a maximum diameter 14*a*, 20*a* of the cutting body 18*a*, in particular as measured perpendicular to a longitudinal axis of the drill shank 30*a*, 32*a*, is at least one and a half times as large as the original diameter of the drill head blank, in particular as measured perpendicular to a longitudinal axis of the drill head blank, in particular prior to the forging process.

Preferably, in a process step, in particular the forging step 184*a*, the drilling unit 34*a*, 36*a* is forged from the drill head blank with a maximum extension 192*a* perpendicular to the rotation axis 16*a*, wherein the original diameter of the drill head blank, in particular as measured perpendicular to a longitudinal axis of the drill head blank, in particular before the forging process, is no more than two thirds as large as the maximum extension 192*a* of the drilling unit 34*a*, 36*a* perpendicular to the rotation axis 16*a* and/or to the longitudinal axis of the drill unit 34*a*, 36*a*.

Preferably, in a method step, in particular a grinding step 186*a*, the radial outer surfaces 142*a*, 144*a* are ground to the cutting body 18*a*.

Figure 19:
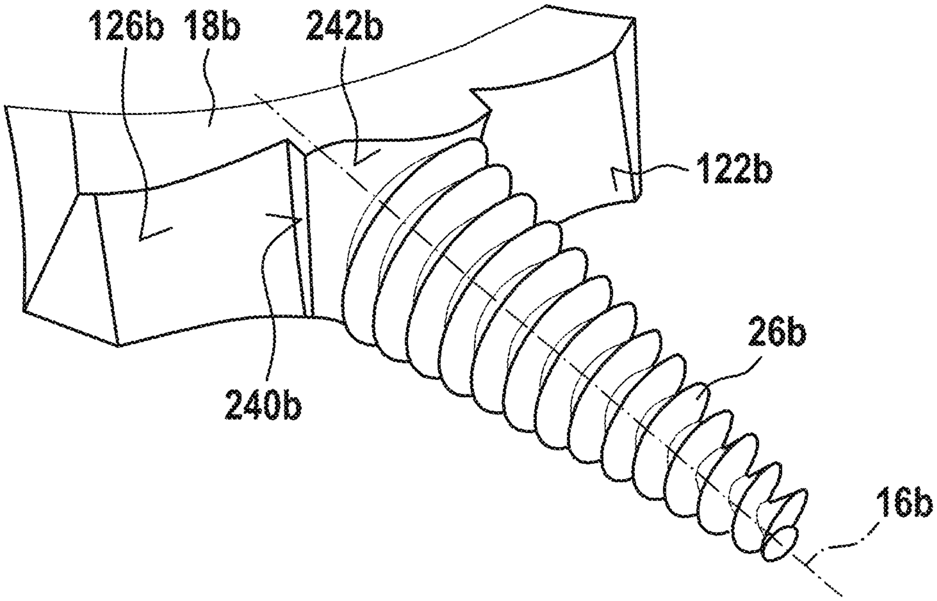
Figure 20:
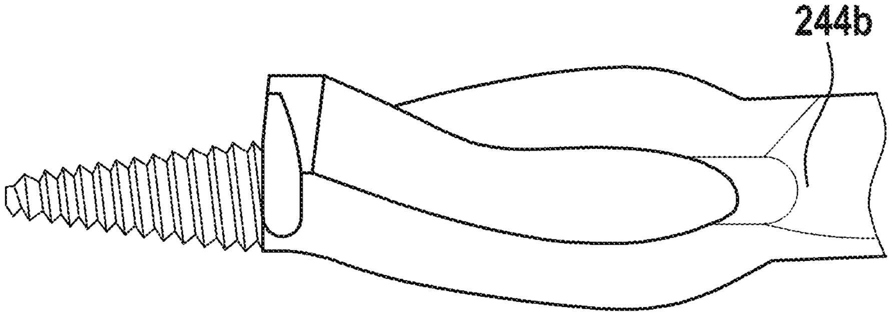

FIGS. 19 and 20 show a further embodiment example of the disclosure. The following descriptions and the drawings are essentially limited to the differences between the embodiment examples, wherein reference can be made in relation to identically designated components, in particular in relation to components with the same reference numbers, in principle also to the drawings and/or the description of the other embodiment examples, in particular FIGS. 1 to 18. In order to distinguish the embodiment examples, the letter a is appended to the reference numbers of the embodiment example in FIGS. 1 to 18. In the embodiment examples of FIGS. 19 and 20, the letter a is replaced by the letter b.

FIG. 19 shows a base side 70*b* of the cutting body 18*b*. The cutting surfaces 116*b*, 118*b* are spaced apart from the rotation axis 16*b* by at least 120% of the maximum thickness, in particular the diameter 90*b*, of a drill tip 26*b*, in particular as measured perpendicular to the rotation axis 16*b*. The cutting surfaces 116*b*, 118*b* are arranged spaced apart from the drill tip 26*b*.

The cutting partial surfaces 122*b*, 126*b* that are arranged facing the drill tip 26*b* are in each case adjacent to a tip surface 240*b* in the direction of the rotation axis 16*b*, which is aligned parallel to the rotation axis 16*b* up to deviations of no more than 10°. Spacer surfaces 242*b* are arranged between the drill tip 26*b* and the cutting partial surfaces 122*b*, 126*b*, which are oriented parallel to the cutting partial surfaces 122*b*, 126*b* apart from deviations of a maximum of 20°. The spacer surfaces 242*b* are arranged along the rotation axis 16*b* at an offset from the cutting surfaces 116*b*, 118*b*.

FIG. 20 shows the cutting body 18*b*. In this example, the cutting body 18*b*, in particular two cutting wings 66*b*, 68*b*, has a rounded drill shank side 244*b*, which is arranged so that it faces a drill shank 30*b*.

The invention claimed is:

1. A wood drilling device for drilling a wood material, comprising:

- at least one drill shank configured to be clamped on a machine tool,
- at least one drill tip having a thread, and
- at least one cutting body (i) configured to cut the wood material, (ii) and defining a rotation axis,
- wherein the at least one cutting body has at least one cutting wing,
- wherein the at least one cutting wing has a cutting surface which is arranged on a base side facing the drill tip,
- wherein the base side is arranged in relation to an imaginary cylinder about the rotation axis, and
- wherein the cutting surface is formed by at least two cutting partial surfaces bordering one another, angled from a drill plane perpendicular to the rotation axis in the direction of the drill shank, the at least two cutting partial surfaces are angled at an angle to one another and each cutting partial surface has an angle other than 0° to the rotation axis; wherein the at least two cutting partial surfaces are formed as flat surfaces.

2. A wood-drilling device according to claim 1, wherein one cutting partial surface of the at least two cutting partial surfaces arranged facing the drill tip has an angle of 5° to the drill plane except for deviations of no more than 2°.

3. A wood-drilling device according to claim 1, wherein a cutting partial surface of the at least two cutting partial surfaces that are arranged facing away from the drilling tip has an angle of 45° to the drill plane except for deviations of no more than 5°.

4. A wood-drilling device according to claim 1, wherein a cutting partial surface of the at least two cutting partial surfaces that are arranged facing the drill tip has a maximum extension perpendicular to the rotation axis which extends no more than twice as far as a maximum extension perpendicular to the rotation axis of a cutting partial surface of the at least two cutting partial surfaces that are arranged facing away from the drill tip.

5. A wood-drilling device according to claim 1, wherein a cutting partial surface of the at least two cutting partial surfaces that are arranged facing the drill tip has a maximum extension perpendicular to the rotation axis which extends at least as far as a maximum extension perpendicular to the rotation axis of a cutting partial surface of the at least two cutting partial surfaces that are arranged facing away from the drill tip.

6. A wood-drilling device according to claim 1, wherein the at least one of the cutting wing has at least two radial outer surfaces which are angled with respect to one another over a radial edge, which extends parallel to the rotation axis up to deviations of no more than 15°, and which are arranged at a free end of the respective cutting wing radially facing away at a maximum distance from the rotation axis.

7. A wood-drilling device according to claim 1, wherein the wood-drilling device is configured for impact drilling a wood material containing metal fragments.

8. A wood-drilling device according to claim 7, wherein the cutting body, on at least one outer side, which is defined in relation to an imaginary cylinder about the rotation axis, has (i) a chipping surface for chip removal from the wood material and/or the metal fragments, and (ii) a chip conveying surface which is adjacent to the chipping surface and which is designed to have a partly concave and partly convex curvature.

9. A wood-drilling device according to claim 1, wherein a ratio of the threaded length of the drill tip to the maximum diameter of the drill tip is greater than 2.0.

10. A wood-drilling device according to claim 1, wherein the at least one cutting wing includes at least two cutting wings arranged symmetrically in relation to one another in relation to the rotation axis of the cutting body.

11. A wood-drilling device according to claim 1, characterized in that the wherein:

- the at least one drill shank, the at least one drill tip and the at least one cutting body form a drilling unit which is formed from a material composition,
- the at least one drilling unit has at least two distinguishable hardness ranges as measured according to Rockwell,
- the at least one drill shank in particular has a shank body with a uniform diameter and a tool connecting body which are directly connected to one another,
- the shank body has a hardness limit which divides the shank body into two hardness regions with different hardness levels, and
- the hardness boundary is arranged at a distance from the tool connecting body.

12. A wood-drilling system, comprising: an electric machine tool; and at least one wood-drilling device according to claim 1.

13. A method of producing a wood-drilling device according to claim 1, comprising: forging at least one drilling unit from a drill head blank, and wherein a maximum diameter of the cutting body, perpendicular to a longitudinal axis of the drill shank, is at least one and a half times the original diameter of the drill head blank as measured perpendicular to a longitudinal axis of the drill head blank, prior to the forging process.

* * * * *